United States Patent
Kobayashi et al.

(10) Patent No.: US 9,769,853 B2
(45) Date of Patent: Sep. 19, 2017

(54) COMMUNICATION APPARATUS, COMMUNICATION SYSTEM, AND COMPUTER-READABLE RECORDING MEDIUM

(71) Applicant: SoftBank Mobile Corp., Tokyo (JP)

(72) Inventors: Takenori Kobayashi, Tokyo (JP); Shuzo Tarumi, Tokyo (JP); Toshiyuki Hijikata, Tokyo (JP); Ryuji Hosoda, Tokyo (JP); Koichiro Kase, Tokyo (JP); Kou Ikeda, Kanagawa (JP); Keita Kamiji, Tokyo (JP); Yusuke Iwadate, Tokyo (JP); Zhiwen Wu, Chiba (JP)

(73) Assignee: SoftBank Corp., Tokyo (JP)

( * ) Notice: Subject to any disclaimer, the term of this patent is extended or adjusted under 35 U.S.C. 154(b) by 47 days.

(21) Appl. No.: 14/622,921

(22) Filed: Feb. 16, 2015

(65) Prior Publication Data
US 2015/0163836 A1 Jun. 11, 2015

Related U.S. Application Data

(63) Continuation of application No. PCT/JP2013/003799, filed on Jun. 18, 2013.

(30) Foreign Application Priority Data

Aug. 17, 2012 (JP) ................ 2012-181229
Apr. 18, 2013 (JP) ................ 2013-087314

(51) Int. Cl.
*H04W 4/00* (2009.01)
*H04W 76/02* (2009.01)
(Continued)

(52) U.S. Cl.
CPC .......... *H04W 76/02* (2013.01); *H04W 48/06* (2013.01); *H04W 48/04* (2013.01); *H04W 84/12* (2013.01)

(58) Field of Classification Search
CPC ...... H04W 72/04; H04W 88/08; H04W 76/00
See application file for complete search history.

(56) References Cited

U.S. PATENT DOCUMENTS

| 5,862,476 A | 1/1999 | Hasegawa |
| 2004/0242276 A1 | 12/2004 | Kashiwagi et al. |

(Continued)

FOREIGN PATENT DOCUMENTS

| JP | H03-277094 A | 12/1991 |
| JP | H10-041969 A | 2/1998 |

(Continued)

OTHER PUBLICATIONS

International Search Report for International Application No. PCT/JP2013/003799, issued by the Japanese Patent Office on Aug. 20, 2013.

(Continued)

*Primary Examiner* — Siren Wei

(57) ABSTRACT

It is left to a communication terminal side to judge whether to switch communication, and appropriate switching is not performed if a communication terminal does not have a function to switch communication based on the quality of communication. A communication apparatus comprises: a data signal transmitting unit that transmits a data signal to a communication terminal; a control signal transmitting unit that transmits a control signal for establishing communication with the communication terminal; and an area control unit that restricts, to a partial area within a communication possible area that a radio wave including the data signal can reach, a communication establishment possible area that a radio wave including the control signal can reach.

9 Claims, 18 Drawing Sheets

(51) Int. Cl.
*H04W 48/06* (2009.01)
*H04W 48/04* (2009.01)
*H04W 84/12* (2009.01)

(56) References Cited

U.S. PATENT DOCUMENTS

| | | | |
|---|---|---|---|
| 2006/0040663 A1 | 2/2006 | Ise et al. | |
| 2006/0278250 A1 | 12/2006 | Winup | |
| 2008/0009307 A1* | 1/2008 | Sekhar | H04W 48/10 455/524 |
| 2008/0304473 A1* | 12/2008 | Farah | H04L 12/66 370/352 |
| 2009/0015478 A1 | 1/2009 | Li et al. | |
| 2010/0075612 A1* | 3/2010 | Oi | H04B 17/327 455/67.13 |
| 2012/0077502 A1 | 3/2012 | Liu | |
| 2012/0108173 A1* | 5/2012 | Hahm | H04W 76/02 455/41.2 |
| 2012/0182877 A1* | 7/2012 | Swaminathan | H04W 24/00 370/242 |
| 2012/0236717 A1* | 9/2012 | Saska | H04W 48/02 370/235 |
| 2013/0077505 A1* | 3/2013 | Choudhary | H04W 48/14 370/252 |

FOREIGN PATENT DOCUMENTS

| | | |
|---|---|---|
| JP | 2006-074835 A | 3/2006 |
| JP | 2008-011064 A | 1/2008 |
| JP | 2008-085792 A | 4/2008 |
| JP | 2008-219733 A | 9/2008 |
| WO | 2007/123980 A1 | 11/2007 |

OTHER PUBLICATIONS

Masataka Iizuka et al., "A study on cell design for high-speed wireless LAN using multirate transmission", 1999 Nen IEICE Communications Society Conference Koen Ronbunshu B-5-89, Aug. 16, 1999 (Aug. 16, 1999), p. 324, passage 4, Nihon University, Funabashi, Japan.

International Preliminary Report on Patentability for International Application No. PCT/JP2013/003799, issued by the International Bureau of WIPO on Feb. 26, 2015.

Office Action issued for counterpart Japanese Application 2013-187889, issued by the Japan Patent Office on Dec. 3, 2013.

Office Action issued for counterpart Japanese Application 2014-010133, issued by the Japan Patent Office on Sep. 24, 2014.

Office Action issued for counterpart Japanese Application 2013-087314, issued by the Japan Patent Office on Nov. 19, 2013.

Office Action issued for counterpart Japanese Application 2012-181229, issued by the Japan Patent Office on Jul. 16, 2013.

Masataka Iizuka and Masahiro Morikura, A study on cell design for high-speed wireless LAN using multirate transmission, Proceedings of the 1999 Communications Society Conference of IEICE, Sep. 7-10, 1999, Nihon University, Funabashi, Japan.

* cited by examiner

| MAC ADDRESS | DATE AND TIME | DISTANCE | DIRECTION | THROUGHPUT |
|---|---|---|---|---|
| xx:yy:zz:aa:aa:aa | 2012/8/1 13:00 | 5.0m | 30° | 20.0Mbps |
| xx:yy:zz:aa:aa:aa | 2012/8/1 13:05 | 6.0m | 25° | 22.0Mbps |
| xx:yy:zz:aa:bb:bb | 2012/8/1 13:06 | 25.0m | 230° | 1.0Mbps |
| xx:yy:zz:aa:bb:bb | 2012/8/1 13:10 | 20.0m | 200° | 0.8Mbps |
| xx:yy:zz:aa:cc:cc | 2012/8/1 13:12 | 21.0m | 210° | 1.1Mbps |
| xx:yy:zz:aa:bb:cc | 2012/8/1 13:14 | 10.0m | 90° | 15.0Mbps |
| ⋮ | ⋮ | ⋮ | ⋮ | ⋮ |

*FIG. 8*

| IDENTIFICATION INFORMATION | COMMUNICATION ESTABLISHMENT | COMMUNICATION APPARATUS 100 | COMMUNICATION APPARATUS 510 | COMMUNICATION APPARATUS 520 |
|---|---|---|---|---|
| COMMUNICATION TERMINAL 200 | COMMUNICATION APPARATUS 100 | 10.0Mbps | 2.0Mbps | 2.0Mbps |
| COMMUNICATION TERMINAL 210 | COMMUNICATION APPARATUS 100 | 3.0Mbps | 8.0Mbps | 2.0Mbps |
| COMMUNICATION TERMINAL 220 | COMMUNICATION APPARATUS 520 | — | 2.0Mbps | 14.0Mbps |
| ⋮ | ⋮ | ⋮ | ⋮ | ⋮ |

FIG. 11

COMMUNICATION APPARATUS, COMMUNICATION SYSTEM, AND COMPUTER-READABLE RECORDING MEDIUM

The contents of the following Japanese patent application(s) are incorporated herein by reference:
NO. 2012-181229 filed on Aug. 17, 2012
NO. 2013-087314 filed on Apr. 18, 2013

BACKGROUND

1. Technical Field

The present invention relates to a communication apparatus, a communication system, and a computer-readable recording medium.

2. Related Art

A communication terminal that: when having detected a wireless LAN access point in a state that communication is established in a wireless communication network, judges whether to switch to communication by the wireless LAN access point based on a result of investigating the quality of communication of the wireless LAN access point; transmits a communication establishment request to the wireless LAN access point; and switches to communication by the wireless LAN access point has been known (for example, Patent Literature 1).
Patent Literature 1: Japanese Patent Application Publication No. 2008-219733

With the widespread use of high functionality cellular phones represented by smartphones, and the widespread use of audio/data communication using cellular phones, the wireless communication traffic has been almost used up. In particular, situations where stable communication cannot be performed have occurred in urban areas crowded by people. To cope with this, offloading of communication traffic to communication networks, such as wireless LAN networks, that are physically different from wireless communication networks is called for, and techniques for implementing switching to communication networks without making users aware of the switching at that time are also called for. Conventional techniques have been disadvantageous in that it is left to the communication terminal side to judge whether to switch communication networks, and appropriate switching is not performed if a communication terminal does not have a function to switch communication networks based on the quality of communication.

BRIEF DESCRIPTION OF THE DRAWINGS

FIG. 8 illustrates one example of a communication status registration table.

FIG. 11 illustrates one example of a communication management table.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
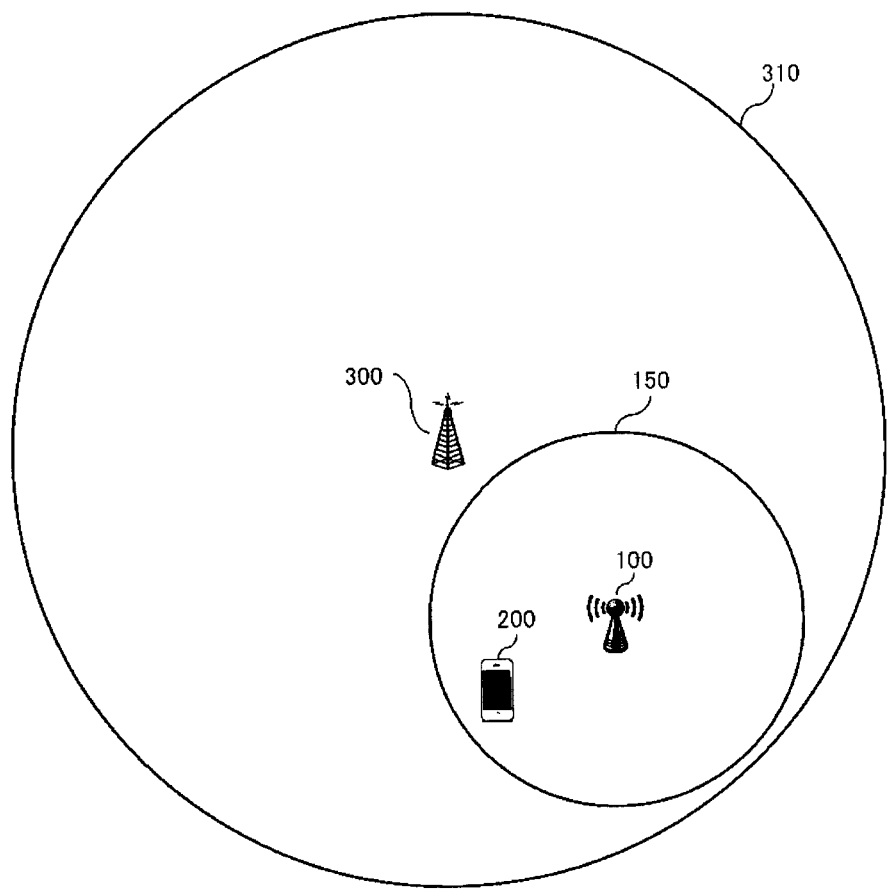
FIG. 1 schematically illustrates one example of a communication environment of a communication apparatus 100.

FIG. 1 schematically illustrates one example of a communication environment of a communication apparatus 100. The communication apparatus 100 is an apparatus that establishes communication with a communication terminal 200, and transmits and receives data signals to/from the communication terminal 200. For example, the communication apparatus 100 is an access point in a wireless LAN. The communication apparatus 100 may be an access point in an infrastructure mode. Also, the communication apparatus 100 may be a communication terminal that plays a role of an access point temporarily in an ad-hoc mode. The communication terminal 200 is an apparatus that can establish communication with the communication apparatus 100. For example, the communication terminal 200 is a smartphone.

The communication apparatus 100 emits radio waves including control signals for establishing communication with the communication terminal 200. Communication between the communication apparatus 100 and the communication terminal 200 is established when the communication apparatus 100 receives a communication establishment request from the communication terminal 200 having received a control signal, and transmits a communication establishment response to the communication terminal 200. Data signals are transmitted and received between the communication apparatus 100 and the communication terminal 200 between which communication has been established. The communication apparatus 100 transmits data signals by emitting radio waves including the data signals.

A communication possible area 150 indicates an area that radio waves including data signals emitted by the communication apparatus 100 can reach. Although in the present embodiment, the communication possible area 150 in a case that the communication apparatus 100 uses a nondirectional antenna is explained as an example, the communication apparatus 100 may comprise a directional antenna.

A base station 300 is a base station that constitutes a wireless communication network. For example, the base station 300 is a base station in a mobile communication system such as the second generation mobile communication system (2G) and the third generation mobile communication system (3G). The base station 300 may be one example of another communication apparatus other than the communication apparatus 100. A wireless communication area 310 indicates a communication area that is covered by the base station 300. The communication terminal 200 may be able to switch between communication with the communication apparatus 100 and communication with the base station 300.

Figure 2:
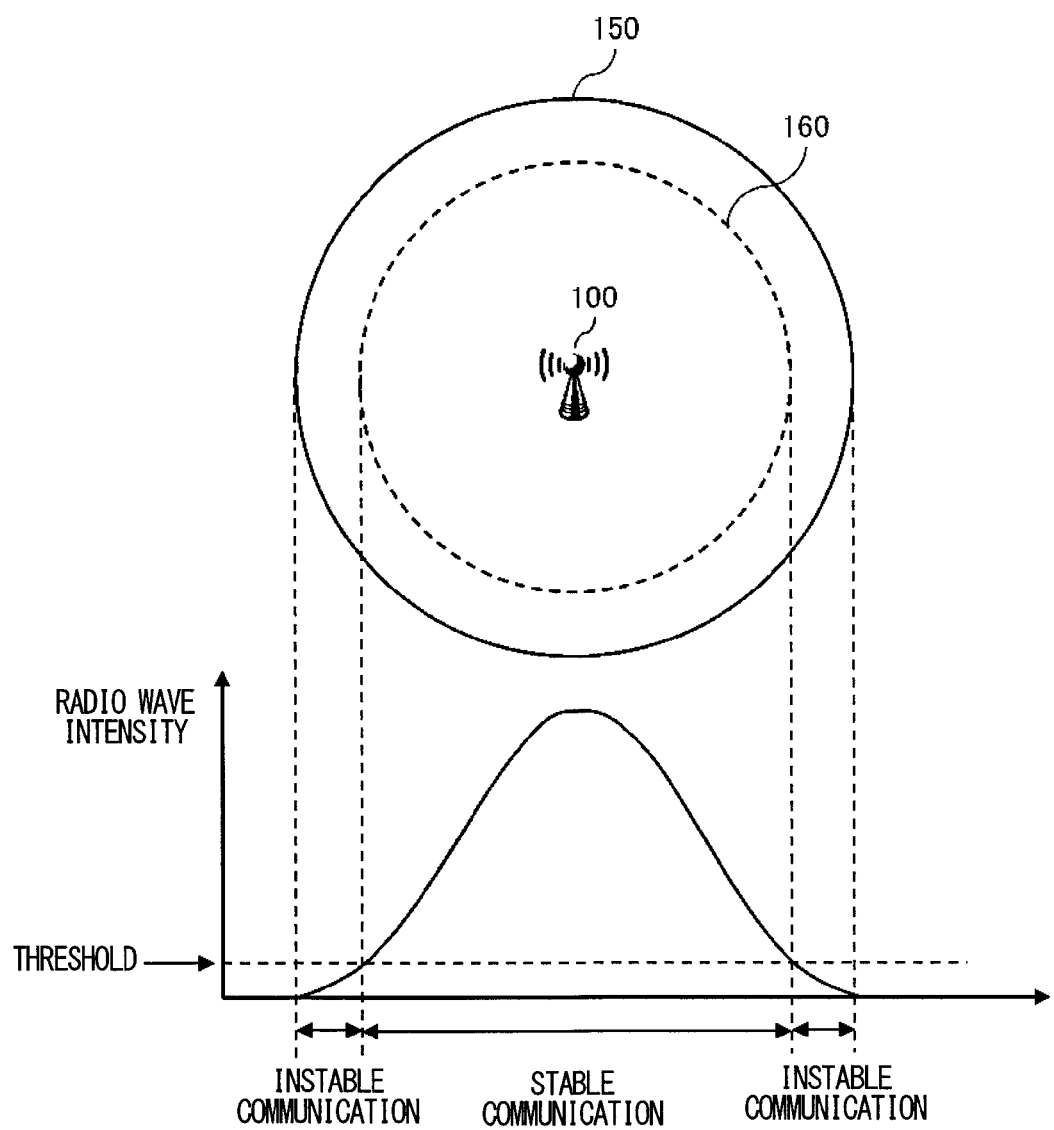
FIG. 2 schematically illustrates the intensity distribution of radio waves including data signals emitted by the communication apparatus 100.

FIG. 2 schematically illustrates the intensity distribution of radio waves including data signals emitted by the communication apparatus 100. The intensity of radio waves emitted by the communication apparatus 100 in principle increases as the position becomes closer to the communication apparatus 100, and decreases as the position becomes farther from the communication apparatus 100. Because when the intensity of radio waves is low, transmitted data is easily lost, the throughput of communication lowers. Accordingly, the closer the position of the communication terminal 200 within the communication possible area 150 is to the outer edge of the communication possible area 150, the lower the throughput of communication between the communication apparatus 100 and the communication terminal 200 is.

A communication stable area 160 indicates an area, in the communication possible area 150, where the communication apparatus 100 and the communication terminal 200 can communicate stably. The area where the communication apparatus 100 and the communication terminal 200 can communicate stably is, for example, an area where the radio wave intensity of radio waves including data signals emitted by the communication apparatus 100 exceeds a certain threshold. An area that is within the communication possible area 150 but outside the communication stable area may be called a fringe area in some cases.

Here, if the communication terminal 200 that is communicating, outside the communication possible area 150, with the base station 300 moves into the fringe area, and switches to communication with the communication apparatus 100 in the fringe area, the communication becomes more instable than communication with the base station 300 in some cases. For example, as in a case that the communication apparatus 100 is a Wi-Fi (registered trademark) access point, and the base station 300 is a 3G base station, even when switching to the communication with the communication apparatus 100 has been performed in order to perform communication at a higher throughput, the throughput becomes lower conversely in some cases because communication with the communication apparatus 100 is instable. To solve such an issue, the communication apparatus 100 according to the present embodiment restricts an area that radio waves including control signals can reach.

Figure 3:
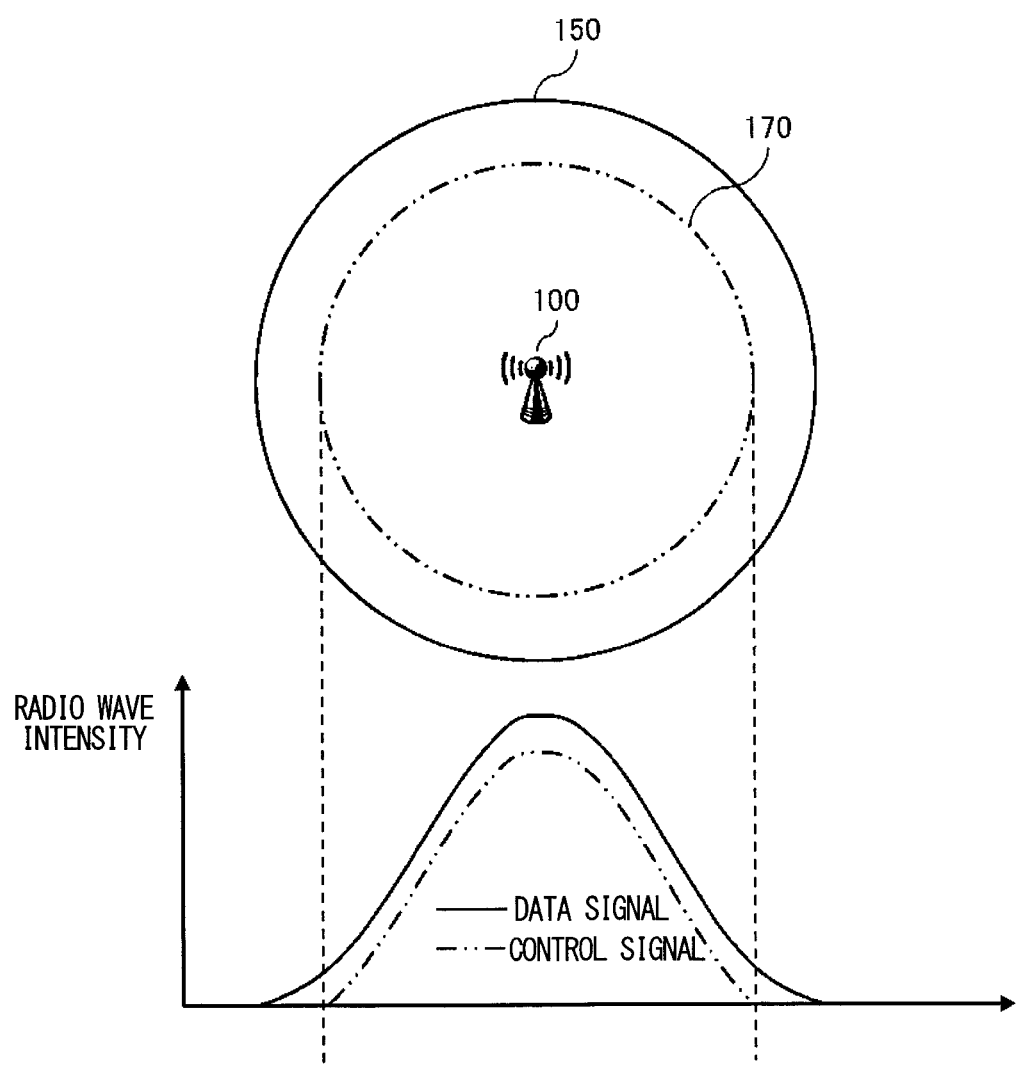
FIG. 3 schematically illustrates a communication establishment possible area 170 that radio waves including control signals emitted by the communication apparatus 100 can reach, and the intensity distribution of the radio waves including the control signals.

FIG. 3 schematically illustrates a communication establishment possible area 170 that radio waves including control signals emitted by the communication apparatus 100 can reach, and the intensity distribution of the radio waves including the control signals. The communication apparatus 100, for example, restricts the communication establishment possible area 170 by controlling the transmission level of radio waves including control signals.

The communication apparatus 100 may restrict the communication establishment possible area 170 to a partial area of the communication possible area 150 by lowering the transmission level of radio waves including control signals such that the transmission level becomes lower than the transmission level of radio waves including data signals. Thereby, radio waves including control signals no longer reach the vicinity of the outer edge of the communication possible area 150 within the communication possible area 150. Accordingly, establishment of communication between the communication apparatus 100 and the communication terminal 200 can be prevented in an area where the radio wave intensity is low.

The communication apparatus 100 may restrict the communication establishment possible area 170 to a partial area where the intensity of radio waves exceeds a predetermined threshold. That is, the communication apparatus 100 may restrict a communication establishment possible area to a partial area where the throughput between the communication apparatus 100 and the communication terminal 200 exceeds a predetermined threshold. Thereby, establishment of communication between the communication apparatus 100 and the communication terminal 200 can be prevented in an area where the communication apparatus 100 and the communication terminal 200 cannot communicate at a throughput that exceeds a predetermined threshold.

Figure 4:
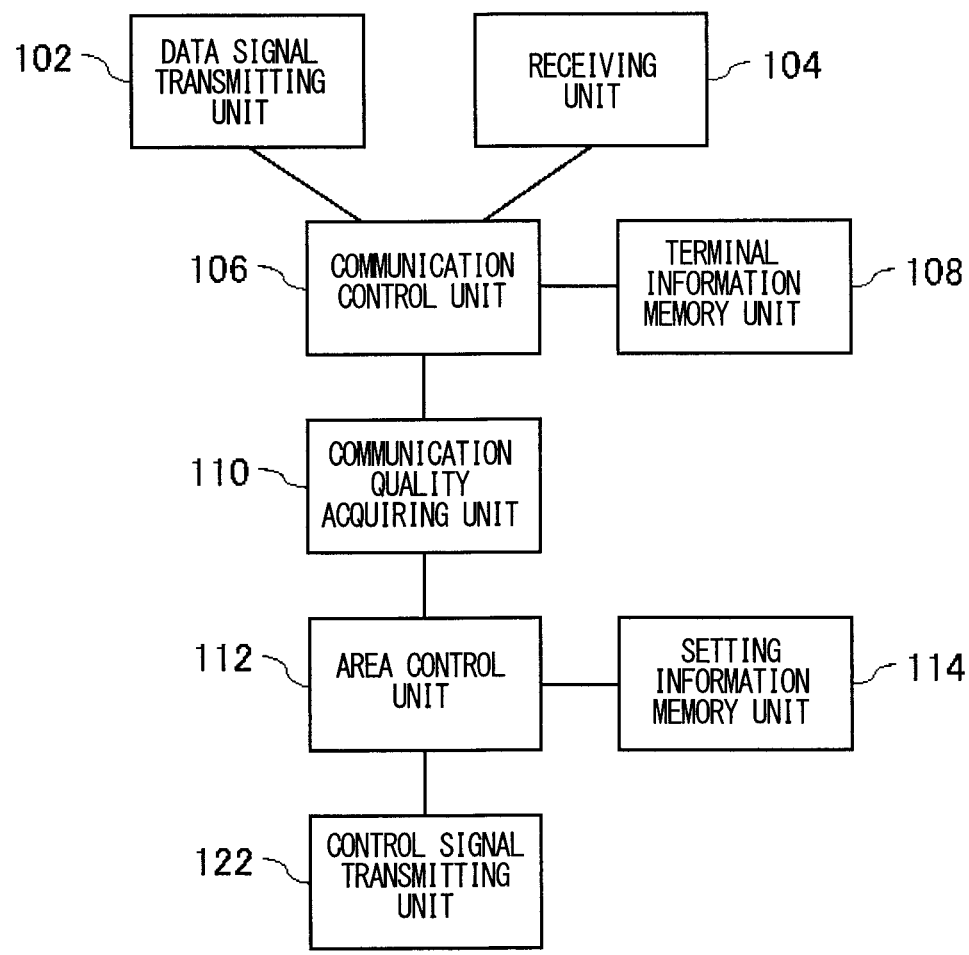
FIG. 4 schematically illustrates the functional configuration of the communication apparatus 100.

FIG. 4 schematically illustrates the functional configuration of the communication apparatus 100. A data signal transmitting unit 102 transmits data signals to the communication terminal 200. A receiving unit 104 receives data signals and control signals from the communication terminal 200. A communication control unit 106 controls communication between the communication apparatus 100 and the communication terminal 200. A terminal information memory unit 108 memorizes the identification information of the communication terminal 200. For example, the terminal information memory unit 108 may memorize the MAC address of the communication terminal 200 as identification information.

A communication quality acquiring unit 110 acquires the quality of communication between the communication apparatus 100 and the communication terminal 200. The communication quality acquiring unit 110, for example, acquires the signal intensity of data signals received by the receiving unit 104 as the quality of communication between the communication apparatus 100 and the communication terminal 200.

Also, the communication quality acquiring unit 110 may acquire the throughput between the communication apparatus 100 and the communication terminal 200 as the quality of communication between the communication apparatus 100 and the communication terminal 200. The communication quality acquiring unit 110, for example, acquires the throughput between the communication apparatus 100 and the communication terminal 200 by executing a ping command for the communication terminal 200 and analyzing a response of the ping command.

Here, the communication control unit 106 may disconnect communication between the communication apparatus 100 and the communication terminal 200 when the quality of communication acquired by the communication quality acquiring unit 110 falls below a predetermined reference value. Thereby, it is possible to prevent a situation where communication between the communication apparatus 100 and the communication terminal 200 is established from continuing with the quality of communication remaining low. Note that the communication control unit 106 may disconnect communication by transmitting a communication disconnection request to the communication terminal 200. The communication apparatus 100, for example, disconnects communication by transmitting a disassociation signal to the communication terminal 200.

A predetermined reference value may be the quality of communication between the base station 300 and the communication terminal 200. For example, the communication control unit 106 disconnects communication between the communication apparatus 100 and the communication terminal 200 when the throughput between the communication apparatus 100 and the communication terminal 200 acquired by the communication quality acquiring unit 110 falls below the throughput between the base station 300 and the communication terminal 200. When the communication terminal 200 whose communication with the communication apparatus 100 has been disconnected establishes communication with the base station 300, the communication with the base station 300 can be performed at a higher throughput as compared with the communication with the communication apparatus 100. That is, the communication apparatus 100 according to the present embodiment can induce the communication terminal 200 to switch to communication with higher quality of communication.

Note that the communication control unit 106 may acquire, from the base station 300 or the communication terminal 200, data indicating the quality of communication between the base station 300 and the communication terminal 200. In this case, the base station 300 or the communication terminal 200 acquires the quality of communication in advance during communication between the base station 300 and the communication terminal 200. For example, the communication control unit 106 may acquire the maximum throughput and the average throughput of communication between the base station 300 and the communication terminal 200 as the quality of communication. Note that the communication control unit 106 may acquire, as the quality of communication between the base station 300 and the communication terminal 200, a throughput input by a setter who sets a parameter about communication of the communication apparatus 100.

Also, when communication with the communication terminal 200 is disconnected because the quality of communication falls below a predetermined reference value, the communication control unit 106 may prohibit establishment of communication with the communication terminal 200 until a predetermined length of time elapses. For example, even if communication is reestablished immediately after the communication is disconnected because the quality of communication has fallen below a predetermined reference value when the communication terminal 200 moves from the communication stable area 160 to a fringe area, it cannot be expected that the communication terminal 200 has moved into the communication stable area 160, and that stable communication can be established.

To cope with this, by prohibiting, with the communication control unit 106, establishment of communication with the communication terminal 200 until a predetermined length of time elapses, establishment of communication between the communication apparatus 100 and the communication terminal 200 in a state where the quality of communication is low can be prevented. Also, thereby, in such a case that the communication terminal 200 is positioned in a fringe area or moves back and forth over the boundary between the fringe area and the communication stable area 160, it is possible to prevent establishment and disconnection of communication between the communication apparatus 100 and the communication terminal 200 from being repeated.

Here, a predetermined length of time may vary in units like several seconds, several tens of seconds, and several hundreds of seconds. Also, a predetermined length of time may be set and changed by a setter who performs setting about communication of the communication apparatus 100.

When the communication control unit 106 disconnects communication with the communication terminal 200 because the quality of communication has fallen below a predetermined reference value, the communication control unit 106 may memorize, in the terminal information memory unit 108, the clock time of disconnection in association with the identification information of the communication terminal 200. When the communication control unit 106 receives a communication establishment request from the communication terminal 200, the communication control unit 106 refers to the terminal information memory unit 108, and when the difference between the current clock time and a previous clock time of disconnection does not indicate that a predetermined length of time has elapsed, the communication control unit 106 may prohibit establishment of communication with the communication terminal 200.

An area control unit 112 restricts the communication establishment possible area 170 that radio waves including control signals can reach to a partial area within a communication possible area that radio waves including data signals can reach. The area control unit 112, for example, restricts the communication establishment possible area 170 by controlling the transmission level of radio waves including control signals. The area control unit 112 can make the communication establishment possible area 170 smaller by lowering the transmission level.

Also, the area control unit 112 may control the communication establishment possible area 170 by controlling the transmission rate of radio waves including control signals. The higher the transmission rate of radio waves including control signals, the smaller the area that control signals can reach. Accordingly, the area control unit 112 restricts the communication establishment possible area 170 by improving the transmission rate of radio waves including control signals.

A setting information memory unit 114 memorizes setting information to be used in restricting the communication establishment possible area 170. The setting information memory unit 114, for example, memorizes a first association table 116 in which the transmission level of radio waves including control signals, and the distance that radio waves including control signals can reach are associated. The first association table 116 associates the distance that radio waves can reach for each of a plurality of radio wave transmission levels. When a target reaching distance of radio waves including control signals is determined, the area control unit 112 may determine the transmission level of radio waves including control signals by referring to the transmission level corresponding to the target reaching distance in the first association table 116.

The first association table 116 may be generated in advance based on experiments. For example, the transmission level of radio waves including control signals and the distance that the wave radios can reach are associated by actually measuring the distance, while varying the transmission level. Experiments may be performed in an experimental space without obstacles, or may be performed in an experimental space that is arranged to match an environment where the communication apparatus 100 is to be installed.

The setting information memory unit 114 may memorize a second association table 118 in which the distance from the communication apparatus 100 to the communication terminal 200, and the throughput between the communication apparatus 100 and the communication terminal 200 are associated. The second association table 118 associates each of a plurality of distances with the throughput between the communication apparatus 100 and the communication terminal 200 that is attained when the communication apparatus 100 and the communication terminal 200 are spaced apart by the distance.

The second association table 118 may be generated in advance based on experiments. For example, the distance between the communication apparatus 100 and the communication terminal 200 and the throughput between the communication terminal 200 and the communication apparatus 100 are associated by actually measuring the throughput, while gradually changing the distance.

Also, in an environment where the communication apparatus 100 is actually installed, the second association table 118 may be updated along with communication that is performed between the communication apparatus 100 and the communication terminal 200. For example, the communication apparatus 100, when having received data signals from the communication terminal 200, acquires the throughput between the communication apparatus 100 and the communication terminal 200 and the distance between the communication apparatus 100 and the communication terminal 200, and updates the second association table 118. The communication apparatus 100, for example, acquires the distance between the communication apparatus 100 and the communication terminal 200 by receiving positional information from the communication terminal 200.

The area control unit 112, when restricting the communication establishment possible area 170 to a partial area where the throughput exceeds a certain threshold, may acquire the distance that corresponds to the threshold by referring to the second association table 118. Then, the area control unit 112 may acquire the transmission level that corresponds to the distance by referring to the first association table 116.

A control signal transmitting unit 122 transmits control signals by emitting radio waves including control signals under control of the area control unit 112. Control signals transmitted by the control signal transmitting unit 122 are, for example, beacons in a wireless LAN. By restricting, by means of the area control unit 112, an area where radio waves including beacons can reach to a partial area of the communication possible area 150, it is possible to cause the communication terminal 200 positioned outside the partial area to not recognize the presence of the communication apparatus 100. Thereby, it is possible to prevent establishment of communication between the communication apparatus 100 and the communication terminal 200 that is positioned in an area, within an area where data communication is possible, where the intensity of radio waves including data signals is low and the throughput becomes low.

Also, control signals transmitted by the control signal transmitting unit 122 may be probe responses in a wireless LAN. By restricting, by means of the area control unit 112, an area where radio waves including probe responses can reach to a partial area of the communication possible area 150, it is possible to make the communication terminal 200 positioned outside the partial area unable to receive the probe responses. Thereby, even when the communication apparatus 100 has authenticated probe requests transmitted by the communication terminal 200, if the communication terminal 200 is positioned outside the communication establishment possible area, it is possible to prevent establishment of communication between the communication apparatus 100 and the communication terminal 200.

Figure 5:
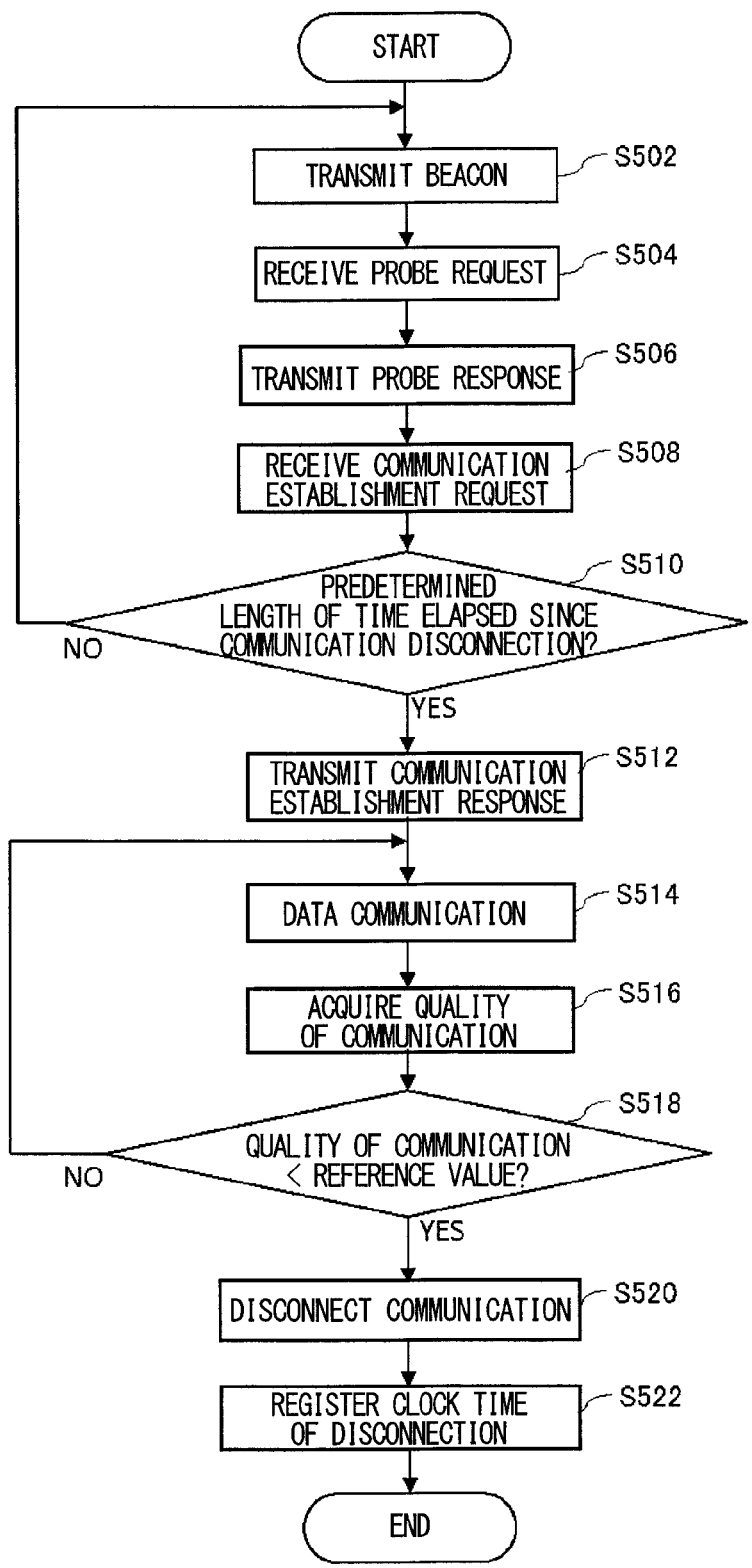
FIG. 5 illustrates one example of a flowchart of processing in which the communication apparatus 100 establishes communication with a communication terminal 200 and performs data communication.

FIG. 5 illustrates one example of a flowchart of processing in which the communication apparatus 100 establishes communication with the communication terminal 200 and performs data communication. At a step S502, the control signal transmitting unit 122 transmits beacons. The control signal transmitting unit 122 restricts, under control of the area control unit 112, an area where the beacons can reach to a partial area within the communication possible area 150, and transmits the beacon.

At a step S504, the receiving unit 104 receives a probe request from the communication terminal 200 that has received the beacons. At a step S506, the control signal transmitting unit 122 transmits a probe response to the communication terminal 200. The control signal transmitting unit 122 restricts, under control of the area control unit 112, an area where the probe response can reach to a partial area of the communication possible area 150, and transmits the probe response.

At a step S508, the receiving unit 104 receives a communication establishment request from the communication terminal 200 that has received the probe response. At a step S510, the communication control unit 106 refers to the terminal information memory unit 108, and judges whether a predetermined length of time has elapsed since a previous clock time of disconnection that is associated with the identification information of the communication terminal 200 that has transmitted the communication establishment request.

When the communication control unit 106 judges that the predetermined length of time has not elapsed since the previous communication disconnection, the process returns to the step S502. As a result, a communication establishment response is not transmitted to the communication terminal 200 that has transmitted the communication establishment request, and communication is not established. When the communication control unit 106 judges that the predetermined length of time has elapsed since the previous communication disconnection, the process proceeds to a step S512. Note that the communication control unit 106 proceeds to the step S512 even when a clock time of disconnection is not associated with the identification information of the communication terminal 200 that has transmitted the communication establishment request.

At the step S512, the control signal transmitting unit 122 transmits a communication establishment response. The control signal transmitting unit 122 restricts, under control of the area control unit 112, an area where the communication establishment response can reach to a partial area within the communication possible area 150, and transmits the communication establishment response.

At a step S514, data signals are transmitted and received between the communication apparatus 100 and the communication terminal 200. At a step S516, the communication quality acquiring unit 110 acquires the quality of communication between the communication apparatus 100 and the communication terminal 200. At a step S518, the communication control unit 106 judges whether the quality of communication acquired at the step S516 falls below a predetermined reference value. When the communication control unit 106 judges that the quality of communication does not fall below the predetermined reference value, the process returns to the step S514. When the communication control unit 106 judges that the quality of communication falls below the predetermined reference value, the process proceeds to a step S520.

At the step S520, the communication control unit 106 disconnects communication between the communication apparatus 100 and the communication terminal 200. At a step S522, the terminal information memory unit 108 memorizes, in association with the identification information of the communication terminal 200, the clock time of disconnection at which communication between the communication apparatus 100 and the communication terminal 200 is disconnected.

Figure 6:
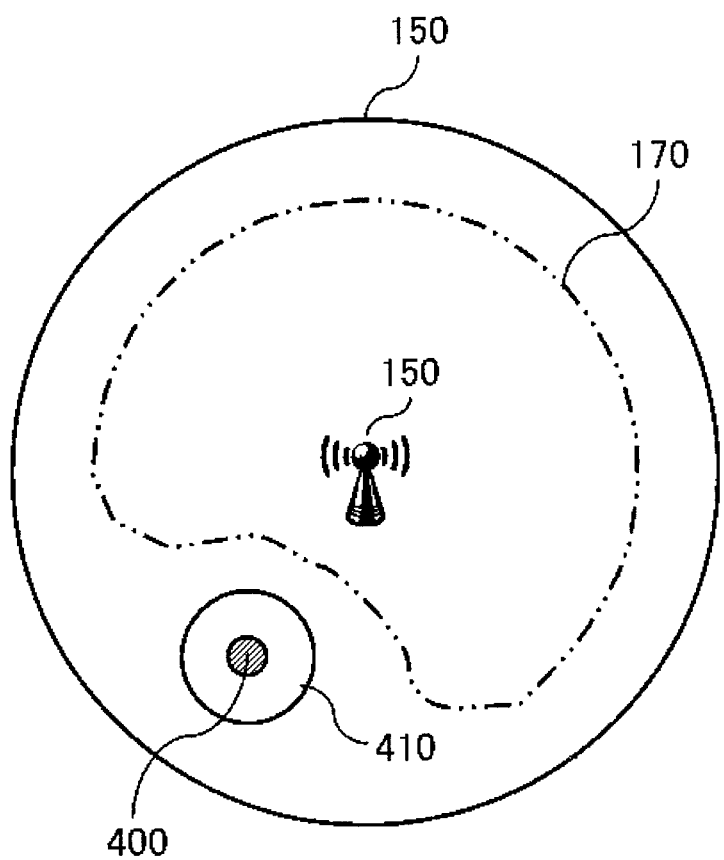
FIG. 6 schematically illustrates the communication establishment possible area 170 in a case that a noise source 400 is present in the vicinity of the communication apparatus 100.

FIG. 6 schematically illustrates the communication establishment possible area 170 in a case that a noise source 400 is present in the vicinity of the communication apparatus 100. The noise source 400 is equipment from which radio waves are emanated, an object that blocks radio waves, or the like, A communication instable area 410 indicates one example of an area where communication becomes instable because radio waves emitted by the communication apparatus 100 are interfered or blocked due to the presence of the noise source 400.

The area control unit 112 restricts the communication establishment possible area 170 such that the communication establishment possible area 170 does not include a fringe area that is attributable to a large distance from the communication apparatus 100, and the communication instable area 410. Also, the area control unit 112 may restrict the communication establishment possible area 170 such that an overlapping area between the communication establishment possible area 170, and the fringe area that is attributable to a large distance from the communication apparatus 100 and the communication instable area 410 becomes small. The communication apparatus 100 may comprise an array antenna, and realize directivity of radio waves including control signals by emitting the radio waves including control signals via the array antenna.

The area control unit 112 may restrict the communication establishment possible area 170 based on the positional information of the noise source 400 that is input by a setter who performs setting about communication of the communication apparatus 100. Also, the area control unit 112 may restrict the communication establishment possible area 170 according to the communication status between the communication apparatus 100 and the communication terminal 200.

Figure 7:
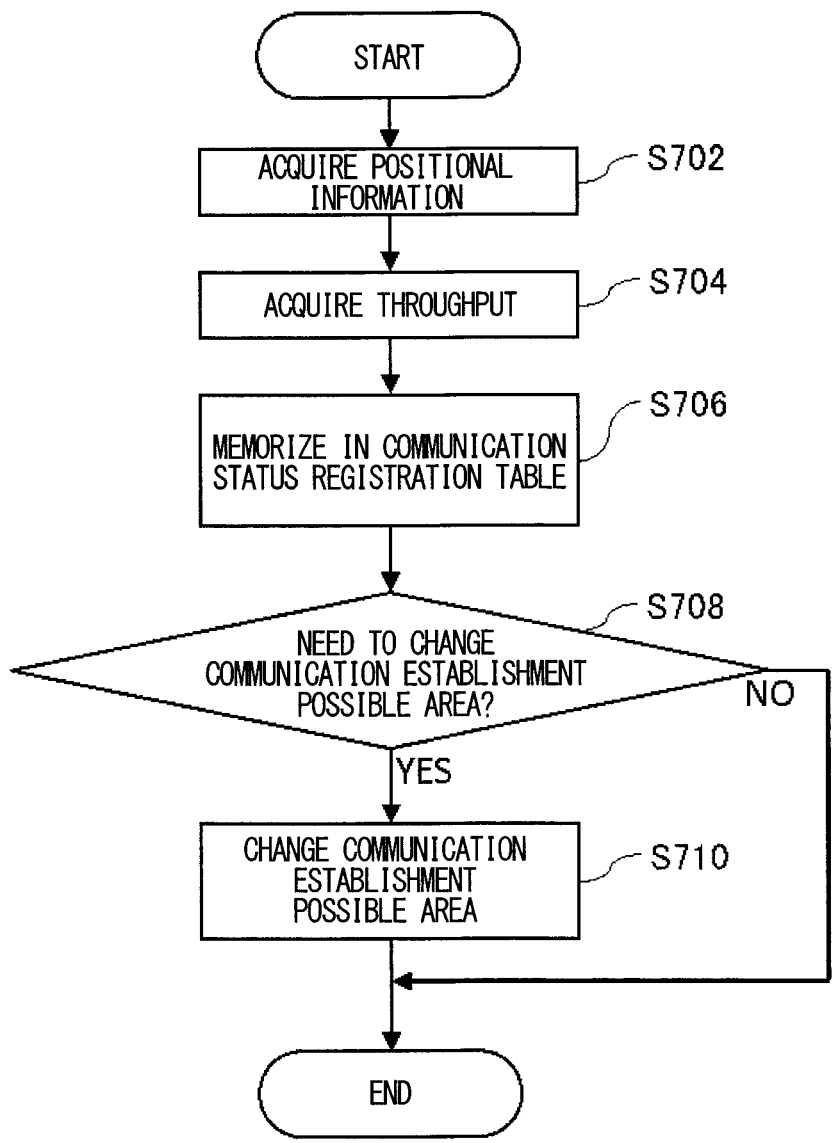
FIG. 7 illustrates one example of a flowchart of processing in which the communication apparatus 100 restricts the communication establishment possible area 170 according to the communication status between the communication apparatus 100 and the communication terminal 200.

FIG. 7 illustrates one example of a flowchart of processing in which the communication apparatus 100 restricts the communication establishment possible area 170 according to the communication status between the communication apparatus 100 and the communication terminal 200. This flowchart starts when the communication apparatus 100 receives data signals from the communication terminal 200.

At a step S 702, the communication apparatus 100 acquires the positional information of the communication terminal 200 that has transmitted the data signals. The communication apparatus 100, for example, acquires the positional information of the communication terminal 200 by receiving GPS (Global Positioning System) information from the communication terminal 200. Also, the communication apparatus 100 may comprise an array antenna, and acquire the positional information of the communication terminal 200 by receiving data signals via the array antenna, and estimating the position of the communication terminal 200 based on the direction from which the data signals are arriving, and the arrival time of the data signals.

At a step S 704, the communication quality acquiring unit 110 acquires the quality of communication between the communication apparatus 100 and the communication terminal 200. The communication quality acquiring unit 110, for example, acquires the throughput corresponding to the radio wave intensity of the data signals received from the communication terminal 200 by referring to the second association table 118 memorized in the setting information memory unit 114.

At a step S 706, the setting information memory unit 114 memorizes, in a communication status registration table, the identification information of the communication terminal 200, the date and time on and at which the data signals are received, the positional information acquired at the step S 702, and the throughput acquired at the step S 704, in association with each other.

At a step S 708, the area control unit 112 judges whether it is necessary to change the communication establishment possible area 170. When a position of the communication terminal 200 where the throughput falls bellows a predetermined threshold is within the communication establishment possible area 170, the area control unit 112, for example, restricts the communication establishment possible area 170 so as to exclude the position.

Also, when a position of the communication terminal 200 where the throughput surpasses a predetermined threshold is outside the communication establishment possible area 170, the area control unit 112 may expand the communication establishment possible area 170 so as to include the position. The area control unit 112 may, for example, expand the communication establishment possible area 170 by improving the transmission level of radio waves including control signals or reducing the transmission rate.

The flowchart illustrated in FIG. 7 may be started when the number of times of data signal reception from the communication terminal 200 equals the number of times that is set by a setter who performs setting about communication of the communication apparatus 100. Also, the flowchart may be started every time data signals are receive from the communication terminal 200.

FIG. 8 illustrates one example of a communication status registration table. The MAC address of the communication terminal 200, the date and time on and at which data signals are received, the positional information acquired at the step S 702, and the throughput acquired at the step S 704 are memorized in the communication status registration table by the setting information memory unit 114. The setting information memory unit 114 memorizes the distance from and direction of the communication apparatus 100 as the positional information of the communication terminal 200.

Also when communication between the communication apparatus 100 and the communication terminal 200 is disconnected because the throughput between the communication apparatus 100 and the communication terminal 200 has fallen below a predetermined reference value, the setting information memory unit 114 may memorize, in the communication status registration table, the identification information and positional information of the communication terminal 200, the throughput, and the date and time on and at which the throughput is judged or the date and time at which communication is disconnected.

The communication apparatus 100 may generate a schedule to restrict the communication establishment possible area 170 based on data registered in the communication status registration table. When a result of analyzing the communication status registration table indicates that the throughput lowers periodically in a partial area within the communication possible area 150, the communication apparatus 100 may generate a schedule to restrict, in accordance with the periodicity, the communication establishment possible area 170 such that radio waves including control signals do not reach the partial area.

For example, in a case that the communication apparatus 100 is installed at a station, when a train arrives, and a large number of passengers holding equipment having communication functions leave the train, the number of noise sources increases; as a result, the throughput of communication lowers. In such a case, the communication apparatus 100 according to the present embodiment can prevent establishment of communication between the communication apparatus 100 and the communication terminal 200 in an area where the throughput lowers.

Also, the communication apparatus 100 may generate a schedule to restrict the communication establishment possible area 170 based on data acquired from the outside. The communication apparatus 100, for example, acquires, from the outside, the status of occurrence of noise sources within the communication possible area 150, and generates a schedule. Specifically, the communication apparatus 100 may generate a schedule by acquiring train arrival clock time data.

Also, the communication apparatus 100 may restrict the communication establishment possible area 170 based on data indicating an area where it is expected to provide communication services. For example, when an area where radio waves including control signals and radio waves including data signals can reach is restricted to the inside of a store such as a restaurant in order to limit provision of communication services to the area inside the store, communication becomes instable at edges of the store. In contrast to this, by restricting only an area where radio waves including control signals can reach to the inside of the store, the communication apparatus 100 according to the present embodiment can restrict establishment of communication to the inside of a store, and, at the same time, provide relatively high-quality communication even at edges of the store.

In the present embodiment, a base station that constitutes a wireless communication network is taken as one example of another communication apparatus other than the communication apparatus 100, and explained. However, another communication apparatus other than the communication apparatus 100 only has to be an apparatus that can establish wireless communication with the communication terminal 200, and may, for example, be a wireless LAN access point.

Also, it was explained that in the present embodiment, the communication control unit 106, when having disconnected communication with the communication terminal 200 because the quality of communication has fallen below a predetermined reference value, prohibits establishment of communication with the communication terminal 200 until a predetermined length of time elapses. Here, the predetermined length of time may be, for example, set by a setter who performs setting about communication with the communication apparatus 100, or may be set based on the moving speed of the communication terminal 200.

The communication control unit 106, when having disconnected communication with the communication terminal 200 because the quality of communication acquired by the communication quality acquiring unit 110 has fallen below a predetermined reference value, may acquire the moving speed of the communication terminal 200. The communication control unit 106 may acquire in advance the positional information of the communication terminal 200, and acquire the moving speed of the communication terminal 200 based on change in the positional information. Also, the communication control unit 106 may acquire, from the communication terminal 200 before communication disconnection, data indicating the moving speed.

The communication control unit 106 may set the predetermined length of time such that the predetermined length becomes shorter as the acquired moving speed increases. When the moving speed of the communication terminal 200 is fast, the possibility of the communication terminal 200 entering into the communication stable area 160 in a short time is high. Accordingly, by setting a short predetermined length of time, the possibility of prohibiting establishment of communication despite the fact that the communication terminal 200 has already moved into the communication stable area 160 can be lowered.

Also, when the moving speed of the communication terminal 200 is slow, the possibility of the communication terminal 200 entering the communication stable area 160 in a short time is low. Accordingly, by setting a long predetermined length of time, it is possible to prevent establishment of communication despite the fact that the communication terminal 200 is still in a fringe area.

Also, when the moving direction of the communication terminal 200 is toward the communication stable area 160, the communication control unit 106 may set a short predetermined length of time as compared with a case that the moving direction is not toward the communication stable area 160. When the moving direction of the communication terminal 200 is toward the communication stable area 160, the possibility of the communication terminal 200 entering the communication stable area 160 in a short time is high. Accordingly, by setting a short predetermined length of time, the possibility of prohibiting establishment of communication despite the fact that the communication terminal 200 has already moved into the communication stable area 160 can be lowered.

Figure 9:
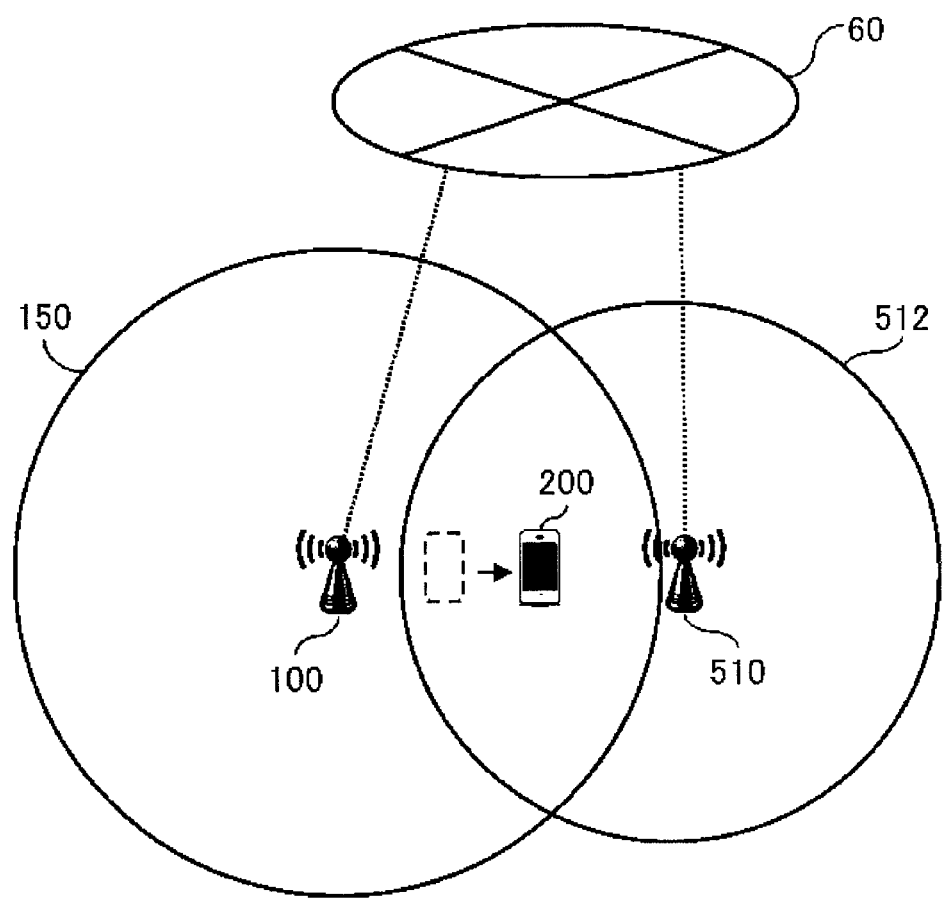
FIG. 9 schematically illustrates one example of a communication environment of the communication apparatus 100 and a communication apparatus 510.

FIG. 9 schematically illustrates one example of a communication environment of the communication apparatus 100 and a communication apparatus 510. The communication apparatus 100 and the communication apparatus 510 are connected via a network 60. The communication apparatus 100 and the communication apparatus 510 may be connected to the network 60 via wired communication, or connected to the network 60 via wireless communication. Also, the communication apparatus 100 and the communication apparatus 510 may be directly connected via wired communication or wireless communication. A communication possible area 512 indicates a communication possible area of the communication apparatus 510.

In the example illustrated in FIG. 9, the communication apparatus 100 acquires the quality of communication with the communication terminal 200. When communication has been established between the communication apparatus 100 and the communication terminal 200, the communication quality acquiring unit 110 that the communication apparatus 100 comprises, for example, acquires the signal intensity of data signals received from the communication terminal 200 as the quality of communication with the communication terminal 200. The communication quality acquiring unit 110 may acquire the quality of communication with the communication terminal 200 by analyzing a response of a ping command.

When communication with the communication terminal 200 has not been established, the communication quality acquiring unit 110, for example, receives data signals emitted toward another communication apparatus with which the communication terminal 200 has established communication, and acquires the signal intensity of the data signals as the quality of communication. The communication quality acquiring unit 110 may convert the signal intensity of data signals into the throughput between the communication apparatus 100 and the communication terminal 200, and acquire the converted throughput as the quality of communication. For example, the communication apparatus 100 converts the signal intensity of data signals into the throughput by referring to a table in which the signal intensity of the data signals, and the throughput between the communication apparatus 100 and the communication terminal 200 at the signal intensity are associated. The communication apparatus 100 may identify the communication terminal 200 that has emitted data signals based on the identification information of the communication terminal 200 included in the header of the data signals. The communication apparatus 510 has a function that is similar to that of the communication apparatus 100.

Here, a case that communication has been established between the communication apparatus 100 and the communication terminal 200 is explained. The communication apparatus 100 acquires the quality of communication between the communication apparatus 100 and the communication terminal 200. Also, the communication apparatus 100 receives the quality of communication between the communication apparatus 510 and the communication terminal 200 from the communication apparatus 510 via the network 60.

When having judged that the acquired quality of communication between the communication apparatus 100 and the communication terminal 200 has fallen below the quality of communication, received from the communication apparatus 510, between the communication apparatus 510 and the communication terminal 200, the communication apparatus 100 disconnects communication between the communication apparatus 100 and the communication terminal 200. Thereby, the communication terminal 200 can be given an opportunity to establish communication with the communication apparatus 510.

For example, when the communication terminal 200 has moved in a direction away from the communication apparatus 100 and toward the communication apparatus 510, the quality of communication with the communication apparatus 100 lowers, and the quality of communication with the communication apparatus 510 improves. According to the present embodiment, when the quality of communication between the communication terminal 200 and the communication apparatus 100 has fallen below the quality of communication between the communication terminal 200 and the communication apparatus 510, communication between the communication apparatus 100 and the communication terminal 200 is disconnected. Thereby, the communication terminal 200 becomes able to establish communication with the communication apparatus 510, and by establishing communication with the communication apparatus 510, becomes able to perform communication at higher quality of communication than the quality of communication with the communication apparatus 100.

Figure 10:
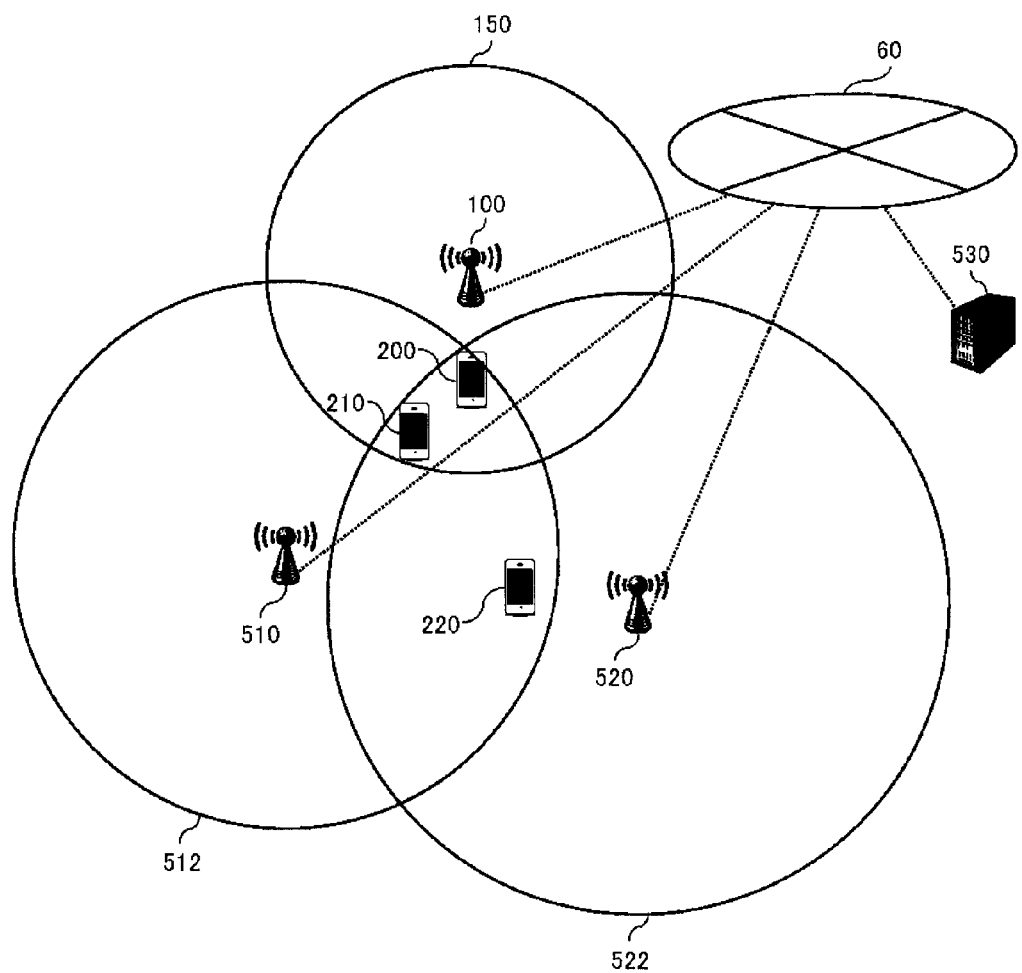
FIG. 10 schematically illustrates one example of a communication environment of the communication apparatus 100, the communication apparatus 510, and a communication apparatus 520.

FIG. 10 schematically illustrates one example of a communication environment of the communication apparatus 100, the communication apparatus 510, and a communication apparatus 520. The communication apparatus 520 has a function that is similar to those of the communication apparatus 100 and the communication apparatus 510. When the communication apparatus 100, the communication apparatus 510, and the communication apparatus 520 are explained without distinguishing among them, they may be simply referred to collectively as a communication apparatus. The communication possible area 512, and a communication possible area 522 indicate communication possible areas of the communication apparatuses 510, 520, respectively.

The communication terminal 210 and the communication terminal 220 are apparatuses that can establish communication with a communication apparatus. When the communication terminal 200, the communication terminal 210, and the communication terminal 220 are explained without distinguishing among them, they may be simply referred to collectively as a communication terminal.

A server apparatus 530 is an apparatus that is connected to a communication apparatus via the network 60. The server apparatus 530 and a communication apparatus may be connected to the network 60 via wired communication, or connected to the network 60 via wireless communication. Also, the server apparatus 530 and the communication apparatus may be directly connected via wired communication or wireless communication.

The server apparatus 530 manages with which communication apparatus of the communication apparatus 100, the communication apparatus 510, and the communication apparatus 520, each of the communication terminal 200, the communication terminal 210, and the communication terminal 220 has established communication. By receiving, from a communication apparatus, the identification information of a communication terminal with which the communication apparatus has established communication, and information indicating that the communication has been established, the server apparatus 530 may manage with which communication apparatus each communication terminal has established communication. Note that a communication apparatus, when having established communication with a communication terminal, may transmit, to the server apparatus 530, the identification information of the communication terminal, and information indicating that the communication has been established.

The server apparatus 530 registers, in a communication management table, the quality of communication, received from a communication apparatus, between the communication apparatus and the communication terminal in association with the identification information of the communication terminal. Also, the server apparatus 530 registers, in the communication management table, about with which of the communication apparatus 100, the communication apparatus 510, and the communication apparatus 520, each of the communication terminal 200, the communication terminal 210, and the communication terminal 220 has established communication.

FIG. 11 illustrates one example of a communication management table. The identification information of a plurality of communication terminals is registered in the communication management table. Also, in association with the identification information of each communication terminal, the identification information of a communication apparatus with which the communication terminal has established communication, and the quality of communication between the communication terminal and each of the plurality of communication apparatuses are registered in the communication management table. FIG. 11 illustrates an example in which the throughput between a communication apparatus and a communication terminal is registered as the quality of communication. The server apparatus 530 may receive, from a communication apparatus, the quality of communication between the communication apparatus and a communication terminal regularly, and update the communication management table based on the received quality of communication.

The server apparatus 530 refers to the communication management table, and judges, about each communication terminal, whether the quality of communication with a communication apparatus with which communication has been established has fallen below the quality of communication with a communication apparatus with which communication has not been established. When the server apparatus 530 judges, about any communication terminal, that the quality of communication has fallen below the quality of communication with a communication apparatus with which communication has not been established, the server apparatus 530 transmits, to the communication apparatus that has established communication with the communication terminal, a disconnection instruction signal including an instruction for disconnecting the communication with the communication terminal. The communication apparatus having received the disconnection instruction signal disconnects communication with the communication terminal with which the communication has been established. Thereby, the communication terminal can be given an opportunity to establish communication with a communication apparatus that allows higher quality of communication.

For example, in the example of the communication management table illustrated in FIG. 11, the server apparatus 530 judges, about the communication terminal 210, that the quality of communication that has been established with the communication apparatus 100 has fallen below the quality of communication with the communication apparatus 510. Then, the server apparatus 530 transmits a disconnection instruction signal to the communication terminal 210. The communication terminal 210 disconnects communication with the communication apparatus 520 according to the received disconnection instruction signal. Thereby, the communication terminal 210 becomes able to establish communication with the communication apparatus 510.

Note that the server apparatus 530 may register, in the communication management table, date and time information on and at which the quality of communication has been acquired in association with the quality of communication. The longer the length of time that has elapsed since the quality of communication has been acquired, the higher the possibility that the quality of communication changes because of change in the position of the communication terminal or for other reasons. To cope with this, the server apparatus 530 may, for example, delete the quality of communication to invalidate it when a certain length of time has elapsed since the quality of communication has been acquired.

Figure 12:
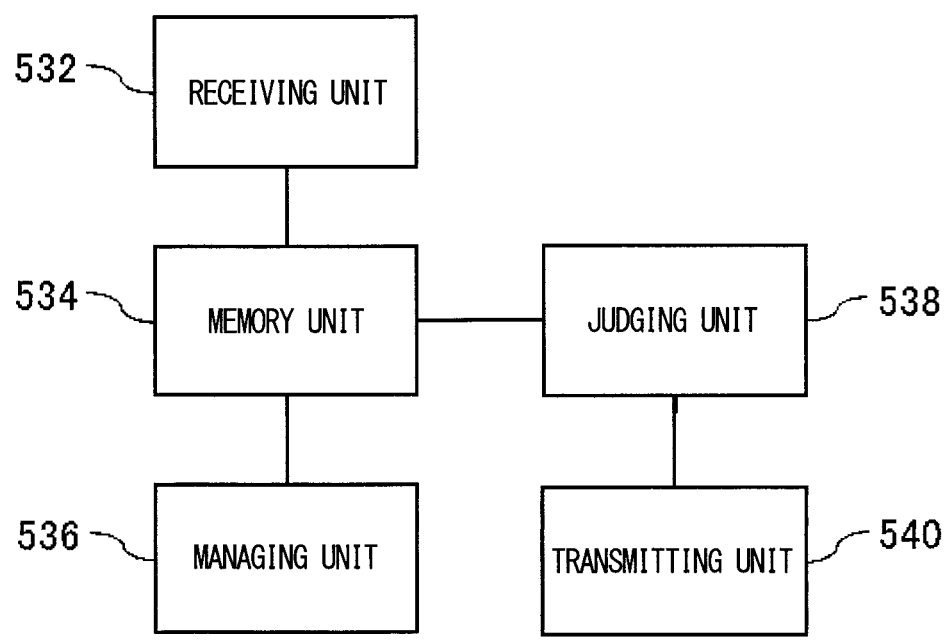
FIG. 12 schematically illustrates the functional configuration of a server apparatus 530.

FIG. 12 schematically illustrates the functional configuration of the server apparatus 530. The server apparatus 530 comprises a receiving unit 532, a memory unit 534, a managing unit 536, a judging unit 538, and a transmitting unit 540. The receiving unit 532 receives, from a plurality of communication apparatuses, the quality of communication between each of the plurality of communication apparatuses and each of a plurality of communication terminals, and the identification information of the communication terminals. The memory unit 534 memorizes a communication management table.

The managing unit 536 manages with which communication apparatus of the plurality of communication apparatuses each of the plurality of communication terminals has established communication. The managing unit 536 may perform the management by registering, in the communication management table, about with which communication apparatus of the plurality of communication apparatuses each of the plurality of communication terminals has established communication.

The judging unit 538 judges, about each of the plurality of communication terminals, whether the quality of communication having been established with a communication apparatus has fallen below the quality of communication with a communication apparatus with which communication has not been established. When there is, among the plurality of communication terminals, a communication terminal whose quality of communication having been established with a communication apparatus has fallen below the quality of communication with a communication apparatus with which communication has not been established, the transmitting unit 540 transmits, to the communication apparatus with which the communication terminal has established communication, a disconnection instruction signal including an instruction for disconnecting communication with the communication terminal.

Note that in the present embodiment, an example in which the server apparatus 530 receives the quality of communication between a communication terminal and a communication apparatus from the communication apparatus, and based on the received quality of communication, transmits a disconnection instruction signal to the communication apparatus was explained. However, the present embodiment is not limited thereto. The server apparatus 530 may acquire the positional information of a plurality of communication apparatuses and the positional information of a plurality of communication terminals, and based on the acquired positional information, transmit a disconnection instruction signal to a communication apparatus.

The server apparatus 530 acquires the positional information of a plurality of communication apparatuses. For example, the server apparatus 530 acquires GPS information from each of the plurality of communication apparatuses. Also, the server apparatus 530 receives the positional information of a plurality of communication terminals. The server apparatus 530 may receive the positional information of a communication terminal from a communication apparatus or the communication terminal. A communication apparatus may, when having performed data communication with the communication terminal, acquire the positional information from a communication terminal, and transmit it to the server apparatus 530. Also, the server apparatus 530 manages with which of the plurality of communication apparatuses each of the plurality of communication terminals has established communication.

The server apparatus 530 calculates the distance between a communication apparatus and a communication terminal based on the positional information of the communication apparatus and the positional information of the communication terminal. Then, the server apparatus 530 acquires the quality of communication between the communication apparatus and the communication terminal based on the calculated distance. The server apparatus 530 may, for example, acquire the quality of communication based on the distance between a communication apparatus and a communication terminal by referring to a table in which the distance and the quality of communication are associated.

When there is, among the plurality of communication terminals, a communication terminal whose quality of communication having been established with a communication apparatus has fallen below the quality of communication with a communication apparatus with which communication has not been established, the server apparatus 530 transmits, to the communication apparatus with which the communication terminal has established communication, a disconnection instruction signal. Thereby, the communication terminal can be given an opportunity to establish communication with a communication apparatus that allows higher quality of communication.

Note that although in the present embodiment, the server apparatus 530 connected to the communication apparatus 100, the communication apparatus 510, and the communication apparatus 520 via the network 60 was explained as an example, the role of the server apparatus 530 may be played by the communication apparatus 100.

Figure 13:
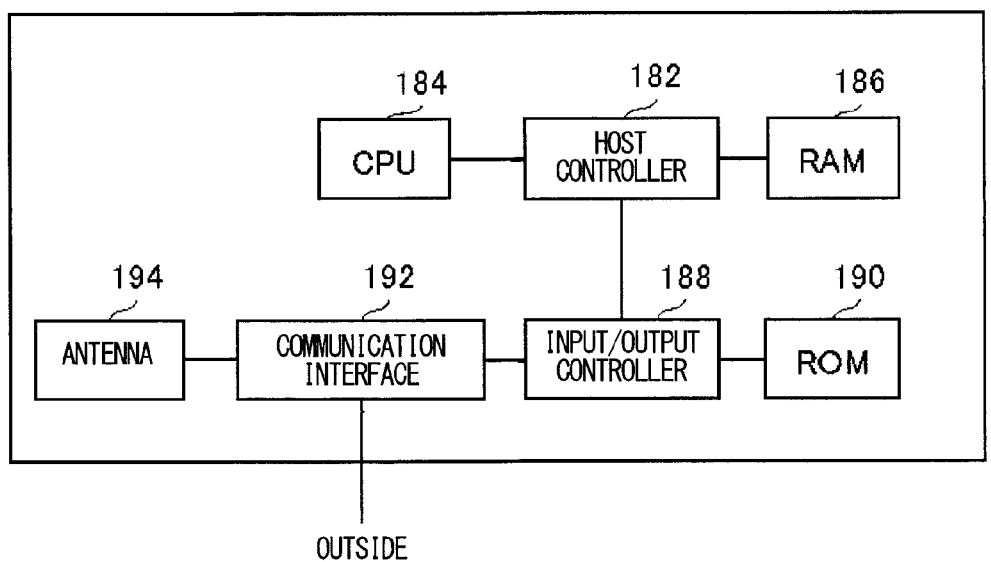
FIG. 13 illustrates the hardware configuration of the communication apparatus 100.

FIG. 13 illustrates the hardware configuration of the communication apparatus 100. The communication apparatus 100 according to the present embodiment comprises a CPU peripheral unit having a CPU 184 and a RAM 186 that are interconnected by a host controller 182, and an input/output unit having a ROM 190, a communication interface 192, and an antenna 194 that are connected to the host controller 182 by an input/output controller 188. The input/output unit may further have a hard disk drive, a CD-ROM drive, and a USB interface.

The host controller 182 connects the RAM 186, and the CPU 184 that accesses the RAM 186 at a high transfer rate. The CPU 184 performs operation based on a program stored in the ROM 190 and the RAM 186, and controls each unit. The input/output controller 188 connects the host controller 182, the communication interface 192 that is a comparatively high-speed input/output apparatus, and the ROM 190.

The communication interface 192 communicates with another communication apparatus via a network. Also, the communication interface 192 transmits and receives control signals and data signals via the antenna 194. Different antennae 194 may be used for transmission of control signals and transmission of data signals. Also, different antennae 194 may be used for reception of control signals and reception of data signals. The hard disk drive stores a program and data to be used by the CPU 184 within the communication apparatus 100. The CD-ROM drive reads out a program or data from a CD-ROM, and provides them to a hard disk drive via the RAM 186. Also, the ROM 190 stores a program and the like depending on a boot program to be run at the time of activating the communication apparatus 100, and on hardware of the communication apparatus 100.

The program provided to the hard disk drive via the RAM 186 is provided by a user by being stored in a recording medium such as a CD-ROM or a USB memory. The program is read out from a recording medium, installed, via the RAM 186, in the hard disk drive within the communication apparatus 100, and run in the CPU 184.

The program installed and run in the communication apparatus 100 acts on the CPU 184 and the like to cause the communication apparatus 100 to function as the data signal transmitting unit 102, the receiving unit 104, the communication control unit 106, the terminal information memory unit 108, the communication quality acquiring unit 110, the area control unit 112, the setting information memory unit 114, and the control signal transmitting unit 122 that were explained in FIGS. 1 to 8.

Figure 14:
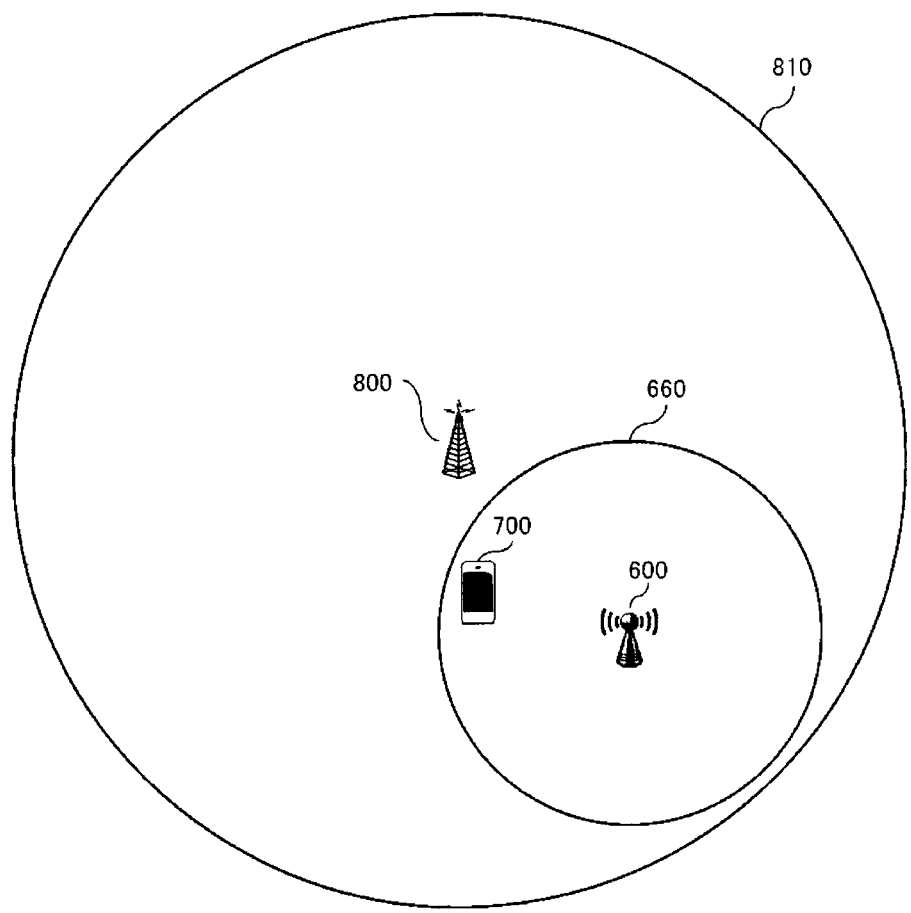
FIG. 14 schematically illustrates one example of a communication environment of a communication apparatus 600.

FIG. 14 schematically illustrates one example of a communication environment of a communication apparatus 600. The communication apparatus 600 is an apparatus that establishes communication with a communication terminal 700, and transmits and receives data signals to/from the communication terminal 700. For example, the communication apparatus 600 is an access point in a wireless LAN. Although in the present embodiment, a case that the communication apparatus 600 is a wireless LAN access point is mainly explained, but the present embodiment is not limited thereto, and the communication apparatus 600 may be a wireless communication apparatus other than a wireless LAN access point. For example, the communication apparatus 600 may be a wireless communication apparatus such as a Femto cell base station and a PHS base station that covers an area in a small cell as compared with 3G, LTE, 4G, and other cellular network base stations. The communication terminal 700 is an apparatus that can establish communication with the communication apparatus 600. For example, the communication terminal 700 is a communication terminal such as a smartphone, a mobile terminal like a conventional cellular phone other than smartphones (hereinafter, referred to as a conventional terminal), a tablet terminal, and a PC that can wirelessly communicate with the communication apparatus 600. Note that the communication apparatus 600 may be an access point in an infrastructure mode. Also, the communication apparatus 600 may be the communication terminal 700 that plays a role of an access point temporarily in an ad-hoc mode.

The communication apparatus 600 receives, from the communication terminal 700, a request signal about establishment of communication. The request signal is, for example, a probe request, an association request, and an authentication request. The communication apparatus 600 receives a request signal by receiving radio waves including a request signal emitted by the communication terminal 700.

The communication apparatus 600 transmits a response signal to the communication terminal 700 when the received request signal meets a condition. The communication apparatus 600 transmits the response signal by emitting radio waves including the response signal. For example, the communication apparatus 600 may transmit a probe response when the signal quality of a received probe request exceeds a threshold, and an ESSID included in the probe request and the ESSID of itself match, or a probe request without designation of an ESSID has been received. Also, the communication apparatus 600 may transmit an authentication response to the communication terminal 700 when the signal quality of a received authentication request exceeds a threshold, and it is judged authentication is possible. Also, the communication apparatus 600 may transmit an association response to the communication terminal 700 when the signal quality of a received association request exceeds a threshold, and it is judged that connection is possible.

By transmitting, by means of the communication apparatus 600, an association response and an authentication response to the communication terminal 700, communication is established between the communication apparatus 600 and the communication terminal 700. Data signals are transmitted and received between the communication apparatus 600 and communication terminal 700 between which communication has been established. The communication apparatus 600 transmits data signals by emitting radio waves including data signals. Also, the communication terminal 700 transmits data signals by emitting radio waves including data signals.

The quality of signals received by the communication apparatus 600 from the communication terminal 700 varies, for example, depending on the distance between the communication apparatus 600 and the communication terminal 700, obstacles between the communication apparatus 600 and the communication terminal 700, and other factors. In principle, the quality of signals received by the communication apparatus 600 from the communication terminal 700 is low when there are noise generation sources between the communication apparatus 600 and the communication terminal 700 as compared with a case that there are not noise generation sources. Also, in principle, the quality of signals received by the communication apparatus 600 from the communication terminal 700 improves as the distance between the communication apparatus 600 and the communication terminal 700 decreases, and lowers as the distance increases.

A communication possible area 660 schematically indicates an area where radio waves emitted by the communication apparatus 600 can reach. Although in the present embodiment, the communication possible area 660 in a case that the communication apparatus 600 uses a nondirectional antenna is explained as an example, the communication apparatus 600 may use a directional antenna.

A base station 800 is a base station that constitutes a wireless communication network. For example, the base station 800 is a base station in a 3G, LTE, 4G, or other mobile communication system. A wireless communication area 810 schematically indicates a communication area that is covered by the base station 800. The communication terminal 700 may be able to switch between communication with the communication apparatus 600 and communication with the base station 800. Switching from communication with the base station 800 to communication with the communication apparatus 600 by the communication terminal 700 may be expressed as "offloading" in some cases.

If the communication terminal 700 that is communicating, outside the communication possible area 660, with the base station 800 moves into the communication possible area 660, and switches to communication with the communication apparatus 600, the communication becomes more instable than communication with the base station 800 in some cases. For example, as in a case that the communication apparatus 600 is a Wi-Fi (registered trademark) access point, and the base station 800 is a 3G base station, although switching to the communication with the communication apparatus 600 has been performed in order to perform communication at a higher throughput, the throughput becomes lower conversely in some cases because communication with the communication apparatus 600 is instable. Solution for such an issue is desired. Also, the communication apparatus 600 is desired in some cases to have a function of adjusting a wireless communication area that it provides. For example, when the number of communication terminals 700 that have established communication with the communication apparatus 600 increases, it is required in some cases to reduce the number of communication terminals 700 that establish communication thereafter. Also, when the communication traffic in the wireless communication area 810 increases, it is required in some cases to increase the number of base stations 800 to establish communication with the communication apparatus 600 in order to reduce the communication traffic. As in these cases, a function of adjusting a wireless communication area provided by the communication apparatus 600 according to situations is desired in some cases. In order to solve the above-described issue and to meet the desire, the communication apparatus 600 according to the present embodiment controls transmission of a response signal according to the signal quality of a request signal received from the communication terminal 700.

Figure 15:
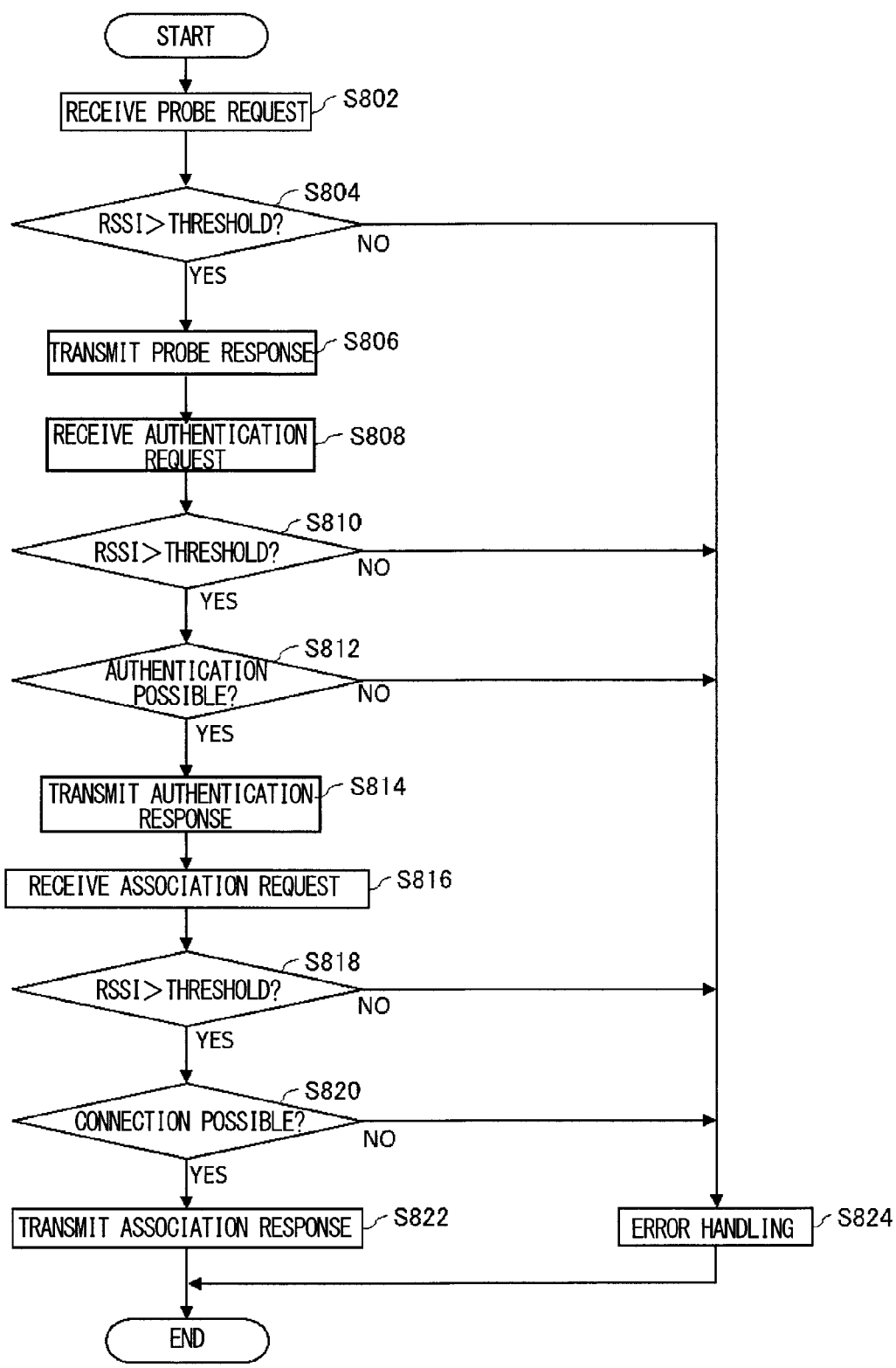
FIG. 15 schematically illustrates one example of an operational flow until communication is established between the communication apparatus 600 and a communication terminal 700.

FIG. 15 schematically illustrates one example of an operational flow until communication is established between the communication apparatus 600 and the communication terminal 700. The operational flow illustrated in FIG. 15 starts when the communication apparatus 600 starts waiting for a request signal.

At a step 802 (hereinafter, a step may be denoted as "S" by omitting "step"), the communication apparatus 600 receives a probe request from the communication terminal 700. At S804, the communication apparatus 600 judges whether the RSSI (Received Signal Strength Indication) of the received probe request is higher than a threshold. If the RSSI is judged to be higher than the threshold at S804, the process proceeds to S806, and if not, the process proceeds to S824. At S806, the communication apparatus 600 transmits a probe response to the communication terminal 700.

At S808, the communication apparatus 600 receives an authentication request from the communication terminal 700. At S810, the communication apparatus 600 judges whether the RSSI of the received authentication request is higher than a threshold. If the RSSI is judged to be higher than the threshold at S810, the process proceeds to S812, and if not, the process proceeds to S824.

At S812, the communication apparatus 600 judges the possibility/impossibility of authentication. For example, the communication apparatus 600 judges the possibility/impossibility by the Open System authentication. Also, the communication apparatus 600 may judge the possibility/impossibility of authentication by the Shared Key authentication. If it is judged that authentication is possible at S812, the process proceeds to S814, and if not, the process proceeds to S824. At S814, the communication apparatus 600 transmits an authentication response to the communication terminal 700.

At S816, the communication apparatus 600 receives an association request from the communication terminal 700. At S818, the communication apparatus 600 judges whether the RSSI of the received association request is higher than a threshold. If it is judged that the RSSI is higher than the threshold at S818, the process proceeds to S820, and if not, the process proceeds to S824.

At S820, the communication apparatus 600 judges the possibility/impossibility of connection with the communication terminal 700. For example, the communication apparatus 600 refers to data included in the association request, and when the transmitter of the association request is a communication terminal 700 for which it is judged that authentication is possible at step S812, judges that connection is possible, and when the transmitter is a communication terminal 700 for which it is not judged that authentication is possible, does not judge that connection is possible. If it is judged that connection is possible at S820, the process proceeds to S822, and if not, the process proceeds to S824. At S822, the communication apparatus 600 transmits an association response to the communication terminal 700. The communication apparatus 600 may transmit an association response including a status code indicating that connection is permitted. Thereby, communication is established between the communication apparatus 600 and the communication terminal 700. Then, the communication establishment process ends.

If it is not judged that the RSSI of the probe request is higher than the threshold at S804, the communication apparatus 600 executes error handling (S824). For example, the communication apparatus 600 does not transmit anything in response to the probe request.

If it is not judged that the RSSI of the authentication request is higher than the threshold at S810, and if it is not judged that authentication is possible at S812, the communication apparatus 600 executes error handling (S824). For example, the communication apparatus 600 does not transmit anything in response to the authentication request. Also, the communication apparatus 600 may transmit a rejection signal indicating rejection of the authentication request to the communication terminal 700. For example, the communication apparatus 600 transmits an authentication response including a status code indicating authentication rejection.

Note that the order of S810 and S812 may be reverse. For example, the communication apparatus 600 may judge that the RSSI of the authentication request is higher than the threshold after judging that authentication is possible by the Shared Key authentication or the Open System authentication. In this case, the process may proceed to S814 if the RSSI is judged to be higher than the threshold, and if not, the process may proceed to S824.

If the RSSI of the association request is not judged to be higher than the threshold at S818, and it is not judged that connection is possible at S820, the communication apparatus 600 executes error handling (S824). For example, the communication apparatus 600 does not transmit anything in response to the association request. Also, the communication apparatus 600 may transmit a rejection signal indicating rejection of an association request to the communication terminal 700. For example, the communication apparatus 600 transmits an association response including a status code indicating connection rejection. Then, the communication establishment process ends. Note that the order of S818 and S820 may be reverse. For example, the communication apparatus 600 may judge that the RSSI of the association request is higher than the threshold after judging that connection is possible based on data included in the association request. In this case, if the RSSI is judged to be higher than the threshold, the process may proceed to S822, and if not, the process may proceed to S824.

As mentioned above, the communication apparatus 600 according to the present embodiment does not transmit a response signal if the RSSI of the received request signal is lower than the threshold, and transmits a response signal if the RSSI is higher than the threshold. When the RSSI of the request signal received from the communication terminal 700 is lower than the threshold, the quality of communication between the communication apparatus 600 and the communication terminal 700 is predicted to be low, even if the communication is established. By not returning a response signal in such a case, the communication apparatus 600 according to the present embodiment can prevent establishment of communication between the communication apparatus 600 and the communication terminal 700 at low quality of communication.

Note that although an example in which the RSSI of each of a probe request, an authentication request, and an association request, and a threshold are compared was explained in FIG. 15, the present embodiment is not limited thereto. The communication apparatus 600 may compare the RSSI of any one or two of a probe request, an authentication request, and an association request, and a threshold.

Also, although the operational flow to execute error handling without establishing communication when any of RSSIs of a probe request, an authentication request, and an association request is not judged to be higher than a threshold was explained as an example in FIG. 15, but the present embodiment is not limited thereto. The communication apparatus 600 may judge whether to execute error handling without establishing communication about a combination of at least two RSSIs of a probe request, an authentication request, and an association request. For example, the communication apparatus 600 does not execute S804 and S810, but executes comparison of a combination of the RSSI of a probe request, the RSSI of an authentication request, and the RSSI of an association request, with a threshold at S818.

The communication apparatus 600 may judge whether the average value of the RSSI of a probe request, the RSSI of an authentication request, and the RSSI of an association request is higher than a threshold. Also, it may be judged whether the average value of two RSSIs of these is higher than a threshold. Thereby, for example, even when the RSSI of a probe request is relatively low, communication can be established if RSSIs of an authentication request and an association request are relatively high. Also, for example, even when the RSSI of an association request is relatively low, communication can be established if RSSIs of a probe request and an authentication request are relatively high.

Also, the communication apparatus 600 may judge whether one or more, or two or more of the RSSI of a probe request, the RSSI of an authentication request, and the RSSI of an association request exceed thresholds. Thereby, when at least one or two of the RSSI of a probe request, the RSSI of an authentication request, and the RSSI of an association request exceed a threshold, communication can be established.

Also, although an example in which the RSSI of a request signal and a threshold are compared at S804, S810, and S818 is explained, other data that represents the signal quality of a request signal and a threshold may be compared. Also, a still another judgment parameter may be adopted, and at S804, S810, and S818, the logical sum or logical product of several items, which are selected from among a plurality of pieces of data representing the signal quality of a request signal, and another judgment parameter, may be used as a judgment condition.

A threshold compared with the RSSI of a probe request at S804, a threshold compared with the RSSI of an authentication request at S810, and a threshold compared with the RSSI of an association request at S818 may be an identical value, or may be different values. Also, for these three thresholds, a larger threshold may be used in latter comparison, and a smaller threshold may be used in latter comparison. For example, the communication apparatus 600 may compare the RSSI of a probe request and a first threshold, compare the RSSI of an authentication request and a second threshold that is smaller than the first threshold, and compare the RSSI of an association request and a third threshold that is smaller than the second threshold.

Also, although the operational flow in which the communication apparatus 600 receives a probe request, an authentication request, and an association request from the communication terminal 700 to establish communication was explained in FIG. 15 as an example, communication may be established by receiving an authentication request and an association request without receiving a probe request. In this case, the operational flow starts at S808.

Figure 16:
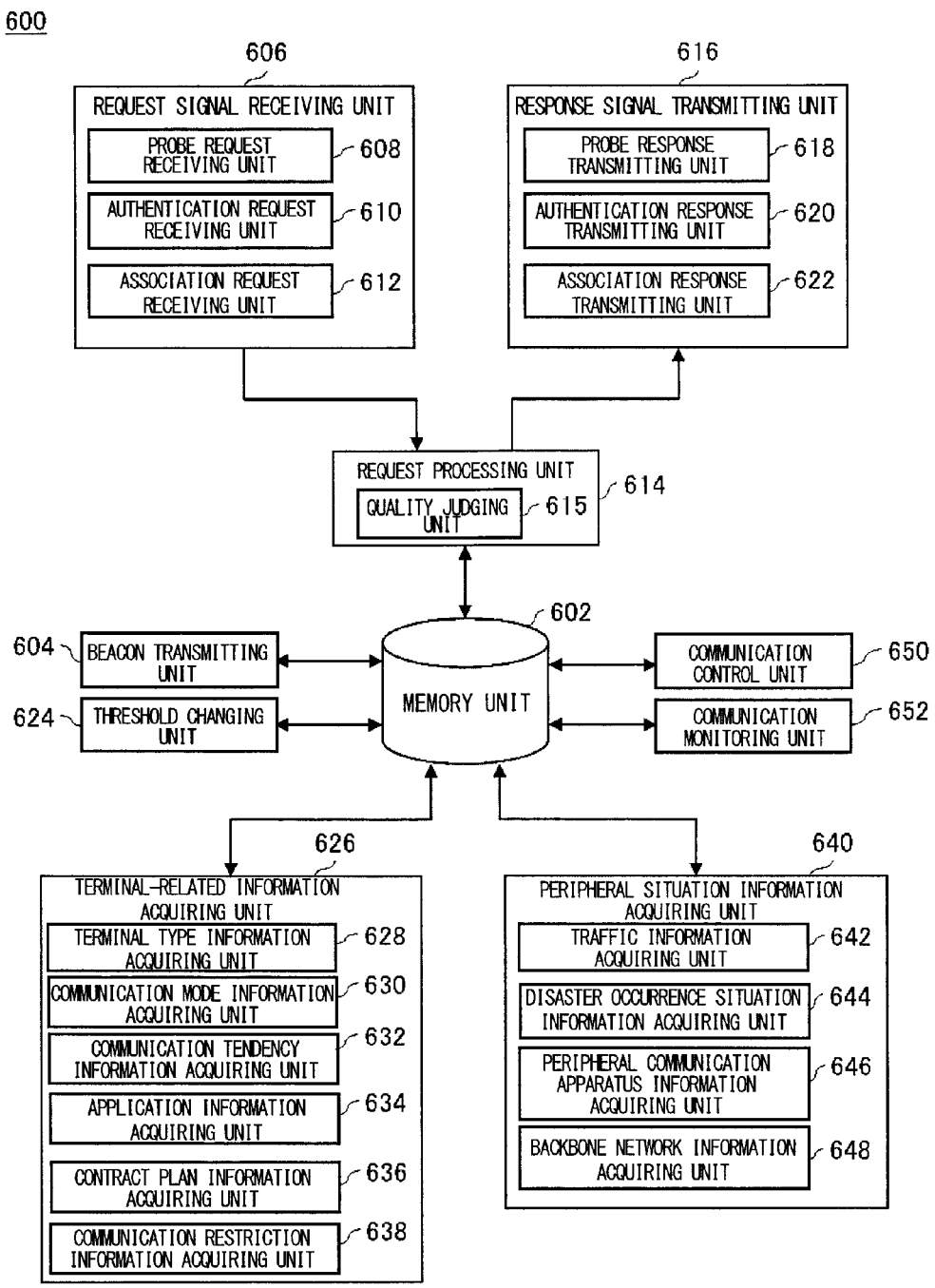
FIG. 16 schematically illustrates one example of the functional configuration of the communication apparatus 600.

FIG. 16 schematically illustrates one example of the functional configuration of the communication apparatus 600. In the present embodiment, the communication apparatus 600 comprises a memory unit 602, a beacon transmitting unit 604, a request signal receiving unit 606, a request processing unit 614, a response signal transmitting unit 616, a threshold changing unit 624, a terminal-related information acquiring unit 626, a peripheral situation information acquiring unit 640, a communication control unit 650, and a communication monitoring unit 652.

The memory unit 602 memorizes various types of data to be used in processes in the communication apparatus 600. The memory unit 602, for example, memorizes the ESSID of the communication apparatus 600.

The beacon transmitting unit 604 transmits beacons. The beacon transmitting unit 604 may transmit beacons including the ESSID of the communication apparatus 600 memorized in the memory unit 602.

The request signal receiving unit 606 receives a request signal from the communication terminal 700. The request signal receiving unit 606 may include a probe request receiving unit 608, an authentication request receiving unit 610, and an association request receiving unit 612. The probe request receiving unit 608 receives a probe request from the communication terminal 700. The authentication request receiving unit 610 receives an authentication request from the communication terminal 700. The association request receiving unit 612 receives an association request from the communication terminal 700.

The request processing unit 614 processes the request signal received by the request signal receiving unit 606. The request processing unit 614 may judge whether the ESSID included in the probe request received by the probe request receiving unit 608 matches the ESSID memorized in the memory unit 602. Also, the request processing unit 614 may judge the possibility/impossibility of authentication about the authentication request received by the authentication request receiving unit 610. Also, the request processing unit 614 may judge the possibility/impossibility of connection about the association request received by the association request receiving unit 612.

The request processing unit 614 includes a quality judging unit 615. The quality judging unit 615 compares the signal quality of the request signal received by the request signal receiving unit 606 and a threshold memorized in the memory unit 602, and judges whether the signal quality of the request signal is higher than the threshold. The signal quality of the request signal may be at least any of an RSSI, a S/N ratio, an RSRQ (Reference Signal Received Quality), and an RSRP (Reference Signal Received Power). For example, the quality judging unit 615 judges whether the RSSI of a request signal is higher than a threshold. Also, the quality judging unit 615 may judge whether the S/N ratio of a request signal is higher than a threshold. Also, the quality judging unit 615 may judge whether the RSRQ of a request signal is higher than a threshold. Also, the quality judging unit 615 may judge whether the RSRP of a request signal is higher than a threshold.

The response signal transmitting unit 616 transmits a response signal to the communication terminal 700. The response signal transmitting unit 616 may include a probe response transmitting unit 618, an authentication response transmitting unit 620, and an association response transmitting unit 622. The probe response transmitting unit 618 transmits a probe response to the communication terminal 700. The authentication response transmitting unit 620 transmits an authentication response to the communication terminal 700. The association response transmitting unit 622 transmits an association response to the communication terminal 700.

Here, the request processing unit 614 may cause the probe response transmitting unit 618 to transmit a probe response when the signal quality of the probe request received by the probe request receiving unit 608 is higher than a threshold, and the ESSID included in the probe request matches the ESSID memorized in the memory unit 602. Also, the request processing unit 614 may cause the authentication response transmitting unit 620 to transmit an authentication response when the signal quality of the authentication request received by the authentication request receiving unit 610 is judged to be higher than a threshold, and it is judged that authentication is possible. Also, the request processing unit 614 may cause the association response transmitting unit 622 to transmit an association response when the signal quality of the association request received by the association request receiving unit 612 is higher than a threshold, and it is judged that connection is possible.

The threshold changing unit 624 changes thresholds memorized in the memory unit 602. Changing the thresholds may mean changing thresholds that have been set, or may mean setting a new threshold.

The threshold changing unit 624 may change thresholds memorized in the memory unit 602 according to predetermined conditions. For example, the threshold changing unit 624 changes thresholds memorized in the memory unit 602 by referring to a threshold list in which predetermined conditions and thresholds are associated, such that the thresholds memorized in the memory unit 602 become the thresholds that correspond to the predetermined conditions. The threshold list may be memorized in the memory unit 602 in advance. The communication apparatus 600 may comprise a threshold list receiving unit (not illustrated) that receives a threshold list from another apparatus, and may memorize the threshold list received by the threshold list receiving unit in the memory unit 602. Also, for example, the threshold changing unit 624 reads out, from a table in which terminal identification information and thresholds are associated, thresholds that correspond to the terminal identification information of the communication terminal 700 that has transmitted a request signal, and changes thresholds memorized in the memory unit 602 to the thresholds that have been read out. Thereby, it can be determined whether to establish communication with the communication terminal 700 based on a threshold that has been set for each communication terminal 700. Note that the table in which terminal identification information and thresholds are associated may be memorized in the memory unit 602 in advance.

Also, the threshold changing unit 624 may change thresholds according to the number of request signals received within a predetermined time period from a communication terminal 700. For example, the threshold changing unit 624 may change thresholds such that the thresholds become lower when it has received signals five times from a communication terminal 700 in one minute. Also, the threshold changing unit 624 may change thresholds such that the thresholds become lower every time it receives request signals successively from a communication terminal 700 in one minute. Thereby, for example, it can be made easy, for a communication terminal 700 that is eager to establish communication with the communication apparatus 600 for reasons such as lowering quality of communication with the base station 800, to establish connection with the communication apparatus 600. Note that, one minute and five times are exemplary, and other time periods or other numbers of times may be used.

The terminal-related information acquiring unit 626 acquires terminal-related information which is information about the communication terminal 700. The terminal-related information acquiring unit 626 may include a terminal type information acquiring unit 628, a communication mode information acquiring unit 630, a communication tendency information acquiring unit 632, an application information acquiring unit 634, a contract plan information acquiring unit 636, and a communication restriction information acquiring unit 638.

The terminal type information acquiring unit 628 acquires terminal type information identifying the type of the communication terminal 700. The terminal type information acquiring unit 628 may receive the terminal type information from the communication terminal 700. Also, the terminal type information acquiring unit 628 may acquire the terminal type information of the communication terminal 700 by referring to an association table in which the terminal identification information and the terminal type information are associated, memorized in the memory unit 602. The terminal type information is, for example, information that indicates which of wireless communication terminals including a smartphone, a conventional terminal, and a mobile route the communication terminal 700 is.

The threshold changing unit 624, for example, changes thresholds such that the thresholds become higher for a smartphone than for a conventional terminal. Thereby, the communication apparatus 600 can avoid establishment of connection with a smartphone unless the signal quality of the smartphone is higher than the signal quality of a conventional terminal. Thereby, it is possible to prevent a smartphone from offloading regardless of low quality of communication that the communication apparatus 600 can provide.

Also, a conventional terminal can be allowed to offload preferentially over a smartphone. Because the communication amount of a conventional terminal is smaller than that of a smartphone, a user of the conventional terminal is more unlikely to feel that the quality of communication is low even if the conventional terminal is allowed to offload in a state that the quality of communication that the communication apparatus 600 can provide is low. Accordingly, when causing any of a smartphone and a conventional terminal to offload from the wireless communication area 810 of the base station 800, one the user of which is unlikely to feel lowering of the quality of communication can be allowed to offload. Thereby, the number of communication terminals 700 that are connected for communication with the base station 800 can be reduced while preventing significant lowering of the quality of communication that a user enjoys.

Also, the threshold changing unit 624 may change thresholds such that the thresholds become higher for a conventional terminal than for a smartphone. Thereby, the communication apparatus 600 can establish connection with a smartphone preferentially over connection with a conventional terminal. For example, when communication traffic in the wireless communication area 810 of the base station 800 is congested, the communication traffic of the wireless communication area 810 can be reduced efficiently by causing a smartphone having a higher to offload preferentially over a conventional terminal. Also, improvement of a communication speed of communication by a smartphone can be expected.

The communication mode information acquiring unit 630 acquires communication mode information indicating a communication mode supported by the communication terminal 700. The communication mode information acquiring unit 630 may receive the communication mode information from the communication terminal 700. Also, the communication mode information acquiring unit 630 may acquire communication mode information of the communication terminal 700 by referring to a table in which terminal identification information and communication mode information are associated memorized in the memory unit 602. The communication mode information is, for example, information indicating which of 3G, LTE, and 4G the communication terminal 700 supports.

The threshold changing unit 624, for example, changes thresholds such that the thresholds become higher for an LTE-supported communication terminal 700 than for an LTE-unsupported communication terminal 700. Thereby, the communication apparatus 600 can avoid establishment of connection with the LTE-supported communication terminal 700 unless the signal quality of the communication terminal 700 is higher than the signal quality of the LTE-unsupported communication terminal 700. Thereby, it is possible to prevent offloading of the communication terminal 700 that has performed LTE communication at a high speed regardless of low quality of communication that the communication apparatus 600 can provide.

Also, the LTE-unsupported communication terminal 700 can be allowed to offload preferentially over the LTE-supported communication terminal 700. Because the communication amount of the communication terminal 700 that does not allows use of LTE is small as compared with that of the LTE-supported communication terminal 700, a user of the LTE-unsupported communication terminal 700 is more unlikely to feel that the quality of communication is low even if the communication terminal 700 is caused to offload in a state that the quality of communication that the communication apparatus 600 can provide is low, as compared with a case that the LTE-supported communication terminal 700 is caused to offload. Accordingly, when causing any of the LTE-supported communication terminal 700 and the LTE-unsupported communication terminal 700 to offload from the wireless communication area 810 of the base station 800, one the user of which is unlikely to feel lowering of the quality of communication can be allowed to offload. Thereby, the number of communication terminals 700 that are connected for communication with the base station 800 can be reduced while preventing significant lowering of the quality of communication that a user enjoys.

Also, the threshold changing unit 624 may change thresholds such that the thresholds become higher for an LTE-unsupported communication terminal 700 than for an LTE-supported communication terminal 700. Thereby, the communication apparatus 600 can establish connection with an LTE-supported communication terminal 700 preferentially over connection with an LTE-unsupported communication terminal 700. For example, when communication traffic in the wireless communication area 810 of the base station 800 is congested, the communication traffic of the wireless communication area 810 can be reduced efficiently by causing an LTE-supported communication terminal 700 with a larger communication amount to offload preferentially over an LTE-unsupported communication terminal 700.

The communication tendency information acquiring unit 632 acquires communication tendency information indicating the tendency of communication of the communication terminal 700. The communication tendency information acquiring unit 632 may receive the communication tendency information from the communication terminal 700. The communication tendency information acquiring unit 632 may receive the communication tendency information of the communication terminal 700 from an investigation result providing apparatus that provides a result of investigation about the communication tendency of the communication terminal 700. The communication tendency information is, for example, information indicating the average communication amount, the average communication amount of each time zone, or the like.

The threshold changing unit 624, for example, changes thresholds such that the thresholds become higher for a higher average communication amount. Thereby, the communication apparatus 600 can avoid establishment of connection with a communication terminal 700 with a large average communication amount unless the signal quality of the communication terminal 700 is higher than the signal quality of a smaller average communication amount communication terminal 700. Thereby, it is possible to prevent the larger average communication amount communication terminal 700 from establishing communication with the communication apparatus 600 in a state that the quality of communication is low.

Also, even if communication with the communication apparatus 600 is established in a state that the quality of communication is low, the smaller average communication amount communication terminal 700 can be caused to offload preferentially over the communication terminal 700 with a higher average communication amount. A user of the smaller average communication amount communication terminal 700 is more unlikely to feel that the quality of communication is low even if the communication terminal 700 is caused to offload in a state that the quality of communication that the communication apparatus 600 can provide is low, as compared with a case that the larger average communication amount communication terminal 700 is caused to offload. Accordingly, when causing any of the larger average communication amount communication terminal 700 and the smaller average communication amount communication terminal 700 to offload from the wireless communication area 810 of the base station 800, one the user of which is unlikely to feel lowering of the quality of communication can be allowed to offload. Thereby, the number of communication terminals 700 that are connected for communication with the base station 800 can be reduced while preventing significant lowering of the quality of communication that a user enjoys.

The threshold changing unit 624 may change thresholds such that the thresholds become higher for a higher average communication amount. Thereby, the communication apparatus 600 can establish connection with a larger average communication amount communication terminal 700 preferentially over connection with the smaller average communication amount communication terminal 700. For example, when communication traffic in the wireless communication area 810 of the base station 800 is congested, the communication traffic of the wireless communication area 810 can be reduced efficiently by causing a communication terminal 700 with a larger communication amount to offload preferentially.

The application information acquiring unit 634 acquires application information indicating an application that the communication terminal 700 is running. The application information acquiring unit 634, for example, receives the application information from the communication terminal 700. Also, the application information acquiring unit 634 may receive the application information of the communication terminal 700 from the base station 800. The base station 800, for example, identifies an application that the communication terminal 700 is running by referring to a header included in a data signal packet of the communication terminal 700. The application information is, for example, a package name of an application that the communication terminal 700 is running.

The application information acquiring unit 634 may classify the acquired application information based on the magnitude of communication load. For example, the application information acquiring unit 634 classifies an application that performs streaming and data telephone calls as a high communication load application, an application such as network games that performs communication regularly as a medium communication load application, an application such as mail applications or chat applications that communicate mainly text data as a low communication load application, and an application such as music players and memo applications that in principle perform no communication as a no communication load application.

The threshold changing unit 624, for example, changes thresholds such that the thresholds become higher for a higher communication load application. Thereby, the communication apparatus 600 can avoid establishment of connection with a communication terminal 700 running a higher communication load application unless the signal quality of the communication terminal 700 is higher than the signal quality of a communication terminal 700 running a lower communication load application. Thereby, it is possible to prevent offloading of the communication terminal 700 running a higher communication load application regardless of low quality of communication that the communication apparatus 600 can provide.

Also, the communication terminal 700 running a lower communication load application can be allowed to offload preferentially over the communication terminal 700 running a higher communication load application. A user of the communication terminal 700 running a lower communication load application is more unlikely to feel that the quality of communication is low even if the communication terminal 700 is caused to offload in a state that the quality of communication that the communication apparatus 600 can provide is low, as compared with a case that the communication terminal 700 running a higher communication load application is caused to offload. Accordingly, when causing any of the communication terminal 700 running a higher communication load application and the communication terminal 700 running a lower communication load application to offload from the wireless communication area 810 of the base station 800, one the user of which is unlikely to feel lowering of the quality of communication can be allowed to offload. Thereby, the number of communication terminals 700 that are connected for communication with the base station 800 can be reduced while preventing significant lowering of the quality of communication that a user enjoys.

The threshold changing unit 624 may change thresholds such that the thresholds become higher for a lower communication load application. Thereby, the communication apparatus 600 can establish connection with a communication terminal 700 running a higher communication load application preferentially over connection with the communication terminal 700 running a lower communication load application. For example, when communication traffic in the wireless communication area 810 of the base station 800 is congested, the communication traffic of the wireless communication area 810 can be reduced efficiently by causing a communication terminal 700 running a higher communication load application to offload preferentially.

The contract plan information acquiring unit 636 acquires contract plan information indicating a communication contract plan corresponding to the communication terminal 700. The contract plan information acquiring unit 636 may receive the contract plan information from the communication terminal 700. The contract plan information acquiring unit 636 may receive the contract plan information of the communication terminal 700 from the base station 800. The base station 800 may receive the contract plan information of the communication terminal 700 from a contract managing device that manages the contract status of the communication terminal 700. The contract plan information is, for example, information indicating whether the communication contract plan corresponding to the communication terminal 700 is a packet flat rate system or a packet measured rate system.

The threshold changing unit 624, for example, changes thresholds such that the thresholds become higher for a packet flat rate system than for a packet measured rate system. Thereby, the communication apparatus 600 can avoid establishment of connection with a packet flat rate system communication terminal 700 unless the signal quality of the communication terminal 700 is higher than the signal quality of a packet measured rate system communication terminal 700. Thereby, it is possible to prevent the packet flat rate system communication terminal 700 that is predicted to have a larger communication amount from establishing communication with the communication apparatus 600 at a lower communication quality.

Also, the packet measured rate system communication terminal 700 can be allowed to offload preferentially over the packet flat rate system communication terminal 700 that is predicted to have a larger communication amount. A user of the packet measured rate system communication terminal 700 is more unlikely to feel that the quality of communication is low even if the communication terminal 700 is caused to offload in a state that the quality of communication that the communication apparatus 600 can provide is low, as compared with a case that the packet flat rate system communication terminal 700 is caused to offload. Accordingly, when causing any of the packet flat rate system communication terminal 700 and the packet measured rate system communication terminal 700 to offload from the wireless communication area 810 of the base station 800, one the user of which is unlikely to feel lowering of the quality of communication can be allowed to offload. Thereby, the number of communication terminals 700 that are connected for communication with the base station 800 can be reduced while preventing significant lowering of the quality of communication that a user enjoys.

Also, the threshold changing unit 624 may change thresholds such that the thresholds become higher for a packet measure rate system than for a packet flat rate system. Thereby, the communication apparatus 600 can establish connection with a packet flat rate system communication terminal 700 preferentially over connection with the packet measured rate system communication terminal 700. For example, when communication traffic in the wireless communication area 810 of the base station 800 is congested, the communication traffic of the wireless communication area 810 can be reduced efficiently by causing the packet flat rate system communication terminal 700 that is predicted to have a larger communication amount to offload preferentially.

Note that the contract plan information may be any of a plan that prioritizes communication by the communication apparatus 600 or a plan that prioritizes communication by the base station 800. The threshold changing unit 624 may change thresholds such that the thresholds become higher for a plan that prioritizes communication by the base station 800 than for a plan that prioritizes communication by the communication apparatus 600.

Also, the contract plan information may be information indicating whether the subscribed plan is a plan that restricts data accesses. The threshold changing unit 624 may change thresholds such that the thresholds become higher for a communication terminal 700 that is subscribing to a plan that restricts data accesses than for a communication terminal 700 that is not subscribing to the plan.

These days, there are contract plans that do not display inappropriate contents that are published on the Internet and the like, in terms of restriction of child pornography, laws to protect juveniles, and the like, and in some cases, such control is performed by the DNS. Control is performed, for example, such that the DNS does not perform name resolution for communication terminals that are subscribing to such a contract plan. However, when a communication terminal connects to different networks, the DNS servers that are referred to are different. Because of this, even if the communication terminal is subscribing to the contract plan in a 3G, LTE, 4G, or other wireless communication network, display of inappropriate contents may not be restricted in some cases if the communication terminal connects to another network such as a WiFi network. In contrast to this, because the threshold changing unit 624 according to the present embodiment changes thresholds such that the thresholds become higher for a communication terminal 700 that is subscribing to a plan that restricts data accesses, the threshold changing unit 624 can make it harder or impossible for the communication terminal 700 that is subscribing to such a contract plan that does not allow display of inappropriate contents to connect to the communication apparatus 600, and thus can restrict display of inappropriate contents.

The communication restriction information acquiring unit 638 acquires communication restriction information about communication restriction placed on the communication terminal 700. The communication restriction information acquiring unit 638 may receive the communication restriction information from the communication terminal 700. Also, the communication restriction information acquiring unit 638 may receive the communication restriction information of the communication terminal 700 from the base station 800. The base station 800 may receive the communication restriction information of the communication terminal 700 from a contract managing device that manages the contract status of the communication terminal 700. The communication restriction information is, for example, information indicating that the communication restriction placed on the communication terminal 700 is a strict restriction or a loose restriction, or there are no restrictions.

The threshold changing unit 624, for example, changes thresholds such that the thresholds become higher for a looser communication restriction. Thereby, the communication apparatus 600 can avoid establishment of connection with a communication terminal 700 on which a loose communication restriction is placed unless the signal quality of the communication terminal 700 is higher than the signal quality of a communication terminal 700 on which a strict communication restriction is placed. Thereby, it is possible to prevent offloading of the communication terminal 700 on which a loose communication restriction is placed and that is predicted to have a large communication amount regardless of low quality of communication that the communication apparatus 600 can provide.

Also, the communication terminal 700 on which a strict communication restriction is placed can be allowed to offload preferentially over the communication terminal 700 on which a loose communication restriction is placed. A user of the communication terminal 700 on which a strict communication restriction is placed is more unlikely to feel that the quality of communication is low even if the communication terminal 700 is caused to offload in a state that the quality of communication that the communication apparatus 600 can provide is low, as compared with a case that the communication terminal 700 on which a loose communication restriction is placed is caused to offload. Accordingly, when causing any of the communication terminal 700 on which a looser communication restriction is placed and the communication terminal 700 on which a stricter communication restriction is placed to offload from the wireless communication area 810 of the base station 800, one the user of which is unlikely to feel lowering of the quality of communication can be allowed to offload. Thereby, the number of communication terminals 700 that are connected for communication with the base station 800 can be reduced while preventing significant lowering of the quality of communication that a user enjoys.

Also, the threshold changing unit 624 may change thresholds such that the thresholds become higher for a stricter communication restriction. Thereby, the communication apparatus 600 can establish connection with a communication terminal 700 on which a loose communication restriction is placed preferentially over connection with a communication terminal 700 on which a strict communication restriction is placed. For example, when communication traffic in the wireless communication area 810 of the base station 800 is congested, the communication traffic of the wireless communication area 810 can be reduced efficiently by causing a communication terminal 700 on which a looser communication restriction is placed and that is predicted to have a larger communication amount to offload preferentially.

In this manner, the threshold changing unit 624 may change thresholds memorized in the memory unit 602 based on the terminal-related information acquired by the terminal-related information acquiring unit 626. Thereby, each communication terminal 700 can be caused to offload appropriately. The threshold changing unit 624 may change thresholds based on several pieces of information which are selected from among terminal type information, communication mode information, communication tendency information, application information, contract plan information, and communication restriction information. Thereby, control can be performed whether to cause a communication terminal 700 to offload based on various conditions about the communication terminal 700. Also, the terminal-related information acquiring unit 626 may transmit acquired terminal-related information to a communication control apparatus (not illustrated). Then, the threshold changing unit 624 may receive, from the communication control apparatus, the thresholds determined by the communication control apparatus based on the terminal-related information transmitted by the terminal-related information acquiring unit 626, and change thresholds memorized in the memory unit 602 to the received thresholds.

The peripheral situation information acquiring unit 640 acquires peripheral situation information indicating the peripheral situation of the communication apparatus 600. The peripheral situation information acquiring unit 640 may include a traffic information acquiring unit 642, a disaster occurrence situation information acquiring unit 644, a peripheral communication apparatus information acquiring unit 646, and a backbone network information acquiring unit 648.

The traffic information acquiring unit 642 acquires traffic information about communication traffic of the wireless communication area 810 that covers an area in which the communication apparatus 600 is arranged. The traffic information acquiring unit 642 may receive the traffic information from the base station 800. Also, the traffic information acquiring unit 642 may receive the traffic information of the wireless communication area 810 from a backbone network to which the communication apparatus 600 is connected.

The threshold changing unit 624, for example, changes thresholds memorized in the memory unit 602 such that the thresholds become lower for more congested communication traffic as indicated by the traffic information. Thereby, the number of communication terminals 700 that offload from communication with the base station 800 to communication with the communication apparatus 600 can be increased, and the communication traffic of the wireless communication area 810 can be reduced.

Also, the traffic information acquiring unit 642 may acquire the traffic information of each date and time of the wireless communication area 810. For example, the traffic information acquiring unit 642 may acquire the traffic information of each day of the week of the wireless communication area 810, and may acquire the traffic information of each time zone. Then, the threshold changing unit 624 may change thresholds memorized in the memory unit 602 according to a date and a time. For example, when it is a time zone when the wireless communication area 810 is congested, the threshold changing unit 624 changes thresholds memorized in the memory unit 602 such that the thresholds become lower. Thereby, the number of communication terminals 700 to offload from communication with the base station 800 to communication with the communication apparatus 600 can be increased in a time zone when the wireless communication area 810 is congested, and the communication traffic of the wireless communication area 810 can be reduced.

The disaster occurrence situation information acquiring unit 644 acquires disaster occurrence situation information indicating the disaster occurrence situation of an area in which the communication apparatus 600 is arranged. The disaster occurrence situation information acquiring unit 644 may receive the disaster occurrence situation information from the base station 800.

Also, the disaster occurrence situation information acquiring unit 644 may receive the disaster occurrence situation information of the wireless communication area 810 from a backbone network to which the communication apparatus 600 is connected. The disaster occurrence situation information acquiring unit 644, for example, receives emergency earthquake quick news. Also, the disaster occurrence situation information acquiring unit 644 may acquire the disaster occurrence situation information by using a sensor, such as an earthquake sensor, to detect the occurrence of disaster.

The threshold changing unit 624, for example, changes thresholds memorized in the memory unit 602 such that the thresholds become lower when a disaster has occurred. Thereby, when a disaster has occurred, conditions under which communication with the communication apparatus 600 is established can be made looser, and it becomes possible to cause a larger number of communication terminals 700 to perform communication via the communication apparatus 600. Also, by allowing offload from communication with the base station 800 to communication with the communication apparatus 600, the communication traffic of the wireless communication area 810 can be reduced, and it becomes possible to cause a larger number of communication terminals 700 to perform communication via the base station 800.

The peripheral communication apparatus information acquiring unit 646 acquires peripheral communication apparatus information indicating information of another communication apparatus 600 arranged around the communication apparatus 600. The peripheral communication apparatus information acquiring unit 646 may receive the peripheral communication apparatus information from the base station 800. Also, the peripheral communication apparatus information acquiring unit 646 may receive the peripheral communication apparatus information from a backbone network to which the communication apparatus 600 is connected.

The threshold changing unit 624, for example, changes thresholds memorized in the memory unit 602 such that the thresholds become higher when the number of other communication apparatuses 600 arranged around the communication apparatus 600 is larger. The larger the number of other communication apparatuses 600 that are arranged around the communication apparatus 600, the higher the possibility that another communication apparatus 600 that can provide communication of higher quality to the communication terminal 700 than the quality of communication that the communication apparatus 600 can provide is present. Accordingly, by changing, by means of the threshold changing unit 624, the thresholds such that the thresholds become higher when the number of other communication apparatuses 600 arranged around the communication apparatus is larger, it becomes possible to make higher the possibility that the communication terminal 700 can establish communication of higher quality with another communication apparatus 600.

Also, the threshold changing unit 624, for example, changes thresholds memorized in the memory unit 602 according to the communication situation of another communication apparatus 600 arranged around the communication apparatus 600. The threshold changing unit 624 may change thresholds memorized in the memory unit 602 based on at least any of the traffic information and the throughput information of the other communication apparatus 600. For example, the threshold changing unit 624 changes thresholds memorized in the memory unit 602 such that the thresholds become lower for lower traffic of the communication apparatus 600 and higher traffic of the other communication apparatus 600. Thereby, it is possible to cause the communication terminal 700 that has established communication with the other communication apparatus 600 to offload to the communication apparatus 600, and the traffic of the other communication apparatus 600 can be appropriately reduced.

Also, the threshold changing unit 624 changes thresholds memorized in the memory unit 602 such that the thresholds become higher for higher traffic of the communication apparatus 600 and lower traffic of the other communication apparatus 600. Thereby, it is possible to cause the communication terminal 700 that has established communication with the other communication apparatus 600 to offload to the communication apparatus 600, and the traffic of the communication apparatus 600 can be appropriately reduced.

The backbone network information acquiring unit 648 acquires backbone network information about a backbone network of the communication apparatus 600. The backbone network information acquiring unit 648 may read out the backbone information memorized in the memory unit 602. Also, the backbone network information acquiring unit 648 may receive the backbone network information from the base station 800. Also, the backbone network information acquiring unit 648 may receive the backbone network information from the backbone network to which the communication apparatus 600 is connected. The backbone network information is, for example, information indicating whether the backbone network of the communication apparatus 600 is a wired network, an LTE, or a 3G network.

The threshold changing unit 624, for example, changes thresholds memorized in the memory unit 602 such that the thresholds become higher for a 3G network than for a wired network. Thereby, the communication apparatus 600 can make it easier to establish communication with the communication apparatus 600 in a case that the backbone network is a wired network as compared with a case that the backbone network is a 3G network.

In this manner, the threshold changing unit 624 may change thresholds memorized in the memory unit 602 based on the peripheral situation information acquired by the peripheral situation information acquiring unit 640. The threshold changing unit 624 may change thresholds based on several pieces of information which are selected from among traffic information, disaster occurrence situation information, peripheral communication apparatus information, and backbone network information. Also, the peripheral situation information acquiring unit 640 may transmit acquired peripheral situation information to a communication control apparatus (not illustrated). Then, the threshold changing unit 624 may receive, from the communication control apparatus, the thresholds determined by the communication control apparatus based on the peripheral situation information transmitted by the peripheral situation information acquiring unit 640, and change thresholds memorized in the memory unit 602 to the received thresholds.

The communication control unit 650 controls communication. The communication control unit 650 may control data communication with the communication terminal 700 with which communication has been established. The communication control unit 650 may disconnect communication between the communication apparatus 600 and the communication terminal 700 when the quality of data communication with the communication terminal 700 has fallen below a predetermined reference value. Thereby, it is possible to prevent a situation where communication between the communication apparatus 600 and the communication terminal 700 is established from continuing with the quality of communication remaining low. Note that the predetermined reference value may be memorized in the memory unit 602. The predetermined reference value may be the same as thresholds memorized in the memory unit 602.

The communication control unit 650 may acquire, as the quality of data communication between the communication apparatus 600 and the communication terminal 700, the signal intensity of data signals received from the communication terminal 700. Also, the communication control unit 650 may acquire, as the quality of data communication between the communication apparatus 600 and the communication terminal 700, the throughput between the communication apparatus 600 and the communication terminal 700. The communication control unit 650 may acquire the throughput between the communication apparatus 600 and the communication terminal 700 by monitoring the data communication between the communication apparatus 600 and the communication terminal 700.

The communication control unit 650 may acquire, from the base station 800 or the communication terminal 700, data indicating the quality of communication between the base station 800 and the communication terminal 700. In this case, the base station 800 or the communication terminal 700 acquires in advance the quality of communication between the base station 800 and the communication terminal 700 during the communication. For example, the communication control unit 650 may acquire, as the quality of communication, the maximum throughput and the average throughput of communication between the base station 800 and the communication terminal 700.

The communication control unit 650 may disconnect communication by transmitting a communication disconnection request to the communication terminal 700. The communication apparatus 600, for example, disconnects communication by transmitting a disassociation signal to the communication terminal 700. When the communication terminal 700 whose communication with the communication apparatus 600 has been disconnected establishes communication with the base station 800, it can perform communication at a higher throughput as compared with the communication with the communication apparatus 600. That is, the communication apparatus 600 according to the present embodiment can induce the communication terminal 700 to switch to communication with higher quality of communication.

The communication monitoring unit 652 monitors communication with the communication apparatus 600. The communication monitoring unit 652, for example, monitors communication of the communication apparatus 600, and collects data that makes it possible to estimate a communication situation such as a throughput, a link speed, a communication traffic amount, and a length of time of connection.

The threshold changing unit 624 may change thresholds memorized in the memory unit 602 based on data collected by the communication monitoring unit 652. For example, the threshold changing unit 624 appropriately changes thresholds based on a communication traffic amount collected by the communication monitoring unit 652.

The threshold changing unit 624 may change thresholds such that the thresholds become higher for a higher communication traffic amount of the communication apparatus 600 collected by the communication monitoring unit 652 than for a lower communication traffic amount. That is, when the communication traffic amount increases, the number of communication terminals 700 to offload to the communication apparatus 600 thereafter can be reduced, and when the communication traffic decreases, the number of communication terminals 700 to offload to the communication apparatus 600 thereafter can be increased. Thereby, for example, when the communication traffic amount increases, and it becomes hard to attain a high throughput by communication via the communication apparatus 600, the thresholds are increased, and offloading to the communication apparatus 600 thereafter can be made difficult to perform. In other words, when it became difficult to attain a high throughput by communication via the communication apparatus 600, only communication terminals 700 that share good connection environments with the communication apparatus 600 and can attain high throughputs by communication with the communication apparatus 600 are allowed to connect to the communication apparatus 600.

Figure 17:
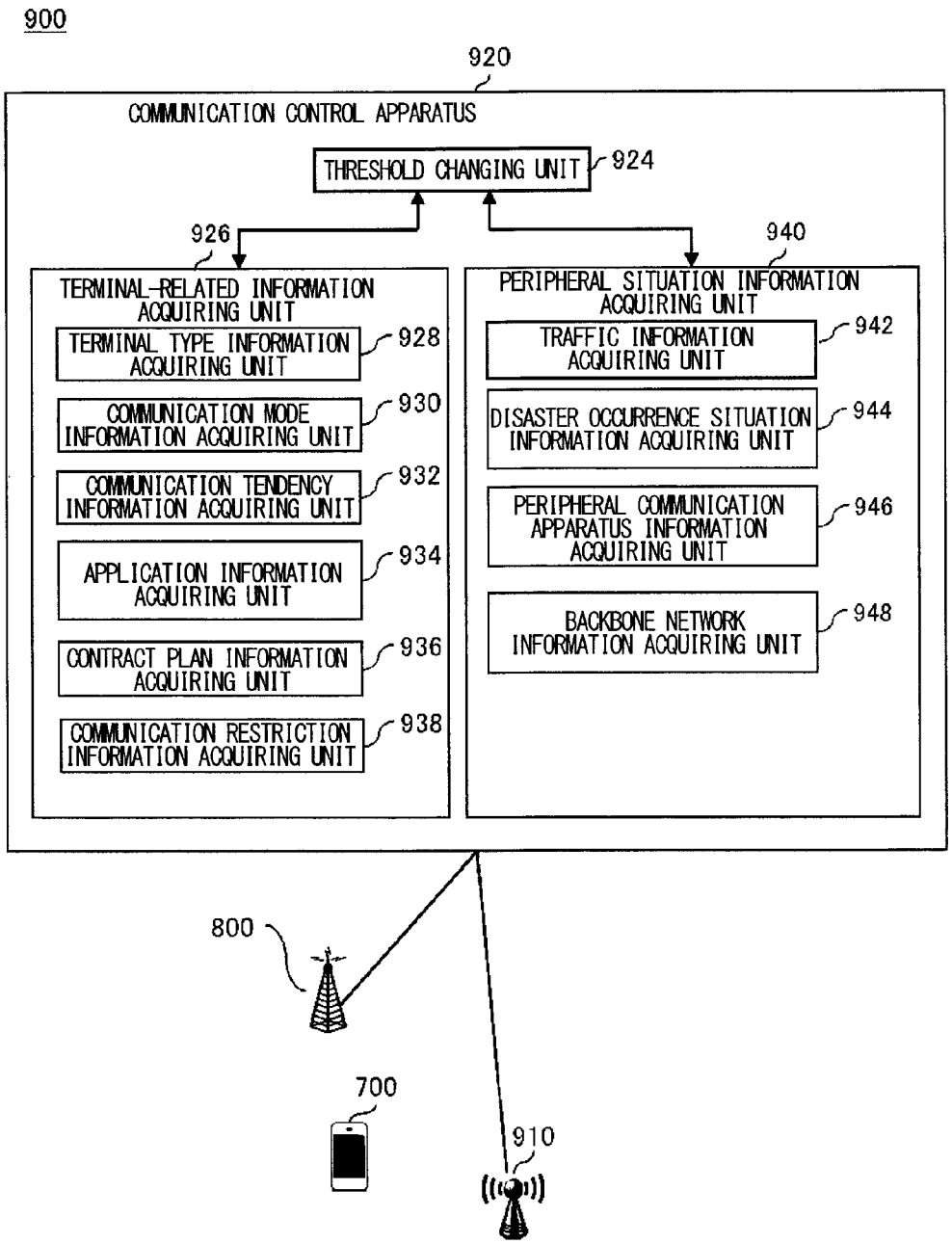
FIG. 17 schematically illustrates one example of a communication environment of a communication control apparatus.

FIG. 17 schematically illustrates one example of a communication environment of a communication system 900. In the present embodiment, the communication system 900 includes a communication apparatus 910 and a communication control apparatus 920. The communication apparatus 910 may have the memory unit 602, the beacon transmitting unit 604, the request signal receiving unit 606, the request processing unit 614, and the response signal transmitting unit 616 that were explained in FIGS. 14 to 16.

The communication control apparatus 920 can communicate with the communication apparatus 910, and receives various types of data from the communication apparatus 910. The communication control apparatus 920 has a threshold changing unit 924 that changes thresholds memorized in the memory unit 602 of the communication apparatus 910. The threshold changing unit 924 may have a function that is identical with that of the threshold changing unit 624. Here, differences from the threshold changing unit 624 are mainly explained.

Also, the communication control apparatus 920 has a terminal-related information acquiring unit 926 and a peripheral situation information acquiring unit 940. The terminal-related information acquiring unit 926 may have a function that is identical with that of the terminal-related information acquiring unit 626. Here, differences from the terminal-related information acquiring unit 626 are mainly explained. Also, the peripheral situation information acquiring unit 940 may have a function that is identical with that of the peripheral situation information acquiring unit 640. Here, differences from the peripheral situation information acquiring unit 640 are mainly explained.

The threshold changing unit 924 may change thresholds memorized in the memory unit 602 according to predetermined conditions. For example, when the communication terminal 700 has transmitted a request signal to the communication apparatus 910, the threshold changing unit 924 reads out, from a table in which terminal identification information and thresholds are associated, thresholds that correspond to the terminal identification information of the communication terminal 700 that has transmitted the request signal, and changes thresholds memorized in the memory unit 602 to the thresholds that have been read out. Also, the threshold changing unit 924 may change thresholds according to the number of request signals that the communication apparatus 910 has received within a predetermined time period from a communication terminal 700.

The terminal-related information acquiring unit 926 acquires terminal-related information which is information about the communication terminal 700. The terminal-related information acquiring unit 926 may include a terminal type information acquiring unit 928, a communication mode information acquiring unit 930, a communication tendency information acquiring unit 932, an application information acquiring unit 934, a contract plan information acquiring unit 936, and a communication restriction information acquiring unit 938.

The terminal type information acquiring unit 928 acquires terminal type information identifying the type of the communication terminal 700. The terminal type information acquiring unit 928 may receive the terminal type information from the communication terminal 700. Also, the terminal type information acquiring unit 928 may receive the terminal type information of the communication terminal 700 from the communication apparatus 910. Also, the terminal type information acquiring unit 928 may acquire the terminal type information of the communication terminal 700 by referring to an association table in which the terminal identification information and the terminal type information are associated, memorized in the memory unit 602. The threshold changing unit 924 may change thresholds memorized in the memory unit 602 based on the terminal type information acquired by the terminal type information acquiring unit 928.

The communication mode information acquiring unit 930 acquires communication mode information indicating a communication mode supported by the communication terminal 700. The communication mode information acquiring unit 930 may receive the communication mode information from the communication terminal 700. Also, the communication mode information acquiring unit 930 may receive the communication mode information from the communication apparatus 910.

Also, the communication mode information acquiring unit 630 may acquire communication mode information of the communication terminal 700 by referring to a table in which terminal identification information and communication mode information are associated, memorized in the memory unit 602. The threshold changing unit 924 may change thresholds memorized in the memory unit 602 based on the communication mode information acquired by the communication mode information acquiring unit 930.

The communication tendency information acquiring unit 932 acquires communication tendency information indicating the tendency of communication of the communication terminal 700. The communication tendency information acquiring unit 932 may receive the communication tendency information from the communication terminal 700. Also, the communication tendency information acquiring unit 932 may receive the communication tendency information of the communication terminal 700 from the communication apparatus 910. Also, the communication tendency information acquiring unit 932 may receive the communication tendency information of the communication terminal 700 from an investigation result providing apparatus that provides a result of investigation about the communication tendency of the communication terminal 700. The threshold changing unit 924 may change thresholds memorized in the memory unit 602 based on the communication tendency information acquired by the communication tendency information acquiring unit 932.

The application information acquiring unit 934 acquires application information indicating an application that the communication terminal 700 is running. The application information acquiring unit 934, for example, receives the application information from the communication terminal 700. Also, the application information acquiring unit 934 may receive the application information of the communication terminal 700 from the communication apparatus 910. Also, the application information acquiring unit 934 may receive the application information of the communication terminal 700 from the base station 800. The threshold changing unit 924 may change thresholds memorized in the memory unit 602 based on the application information acquired by the application information acquiring unit 934.

The contract plan information acquiring unit 936 acquires contract plan information indicating a communication contract plan corresponding to the communication terminal 700. The contract plan information acquiring unit 936 may receive the contract plan information from the communication terminal 700. Also, the contract plan information acquiring unit 936 may receive the contract plan information of the communication terminal 700 from the communication apparatus 910. Also, the contract plan information acquiring unit 936 may receive the contract plan information of the communication terminal 700 from the base station 800. The threshold changing unit 924 may change thresholds memorized in the memory unit 602 based on the contract plan information acquired by the contract plan information acquiring unit 936.

The communication restriction information acquiring unit 938 acquires communication restriction information about communication restriction placed on the communication terminal 700. The communication restriction information acquiring unit 938 may receive the communication restriction information from the communication terminal 700. Also, the communication restriction information acquiring unit 938 may receive the communication restriction information of the communication terminal 700 from the communication apparatus 910. Also, the communication restriction information acquiring unit 938 may receive the communication restriction information of the communication terminal 700 from the base station 800. The threshold changing unit 924 may change thresholds memorized in the memory unit 602 based on the communication restriction information acquired by the communication restriction information acquiring unit 938.

The peripheral situation information acquiring unit 940 acquires peripheral situation information indicating the peripheral situation of the communication apparatus 600. The peripheral situation information acquiring unit 940 may include a traffic information acquiring unit 942, a disaster occurrence situation information acquiring unit 944, a peripheral communication apparatus information acquiring unit 946, and a backbone network information acquiring unit 948.

The traffic information acquiring unit 942 acquires traffic information about communication traffic of the wireless communication area 810 that covers an area in which the communication apparatus 910 is arranged. The traffic information acquiring unit 942 may receive the traffic information from the base station 800. The threshold changing unit 924 may change thresholds memorized in the memory unit 602 based on the traffic information acquired by the traffic information acquiring unit 942.

The disaster occurrence situation information acquiring unit 944 acquires disaster occurrence situation information indicating the disaster occurrence situation of an area in which the communication apparatus 910 is arranged. The disaster occurrence situation information acquiring unit 944 may receive the disaster occurrence situation information from the base station 800.

The disaster occurrence situation information acquiring unit 944, for example, receives emergency earthquake quick news. Also, when the communication control apparatus 920 is arranged in the same area as the communication apparatus 910, the disaster occurrence situation information acquiring unit 944 may acquire the disaster occurrence situation information by using a sensor, such as an earthquake sensor, to detect occurrence of disaster. The threshold changing unit 924 may change thresholds memorized in the memory unit 602 based on the disaster occurrence situation information acquired by the disaster occurrence situation information acquiring unit 944.

The peripheral communication apparatus information acquiring unit 946 acquires peripheral communication apparatus information indicating information of another communication apparatus 910 arranged around the communication apparatus 910. The peripheral communication apparatus information acquiring unit 946 may receive the peripheral communication apparatus information from the base station 800. The threshold changing unit 924 may change thresholds memorized in the memory unit 602 based on the peripheral communication apparatus information acquired by the peripheral communication apparatus information acquiring unit 946.

The backbone network information acquiring unit 948 acquires backbone network information about a backbone network of the communication apparatus 910. The backbone network information acquiring unit 948 may receive the backbone information from the communication apparatus 910.

Also, the backbone network information acquiring unit 948 may receive the backbone network information from the base station 800. Also, the backbone network information acquiring unit 948 may receive the backbone network information from the backbone network to which the communication apparatus 910 is connected. The threshold changing unit 924 may change thresholds memorized in the memory unit 602 based on the backbone network information acquired by the backbone network information acquiring unit 948.

The communication control apparatus 920 may be able to communicate with a plurality of communication apparatuses 910, and the threshold changing unit 924 may change thresholds memorized in the memory unit 602 of each of the plurality of communication apparatuses 910. The threshold changing unit 924 may change the thresholds to values that are different for each of the plurality of communication apparatuses 910.

Figure 18:
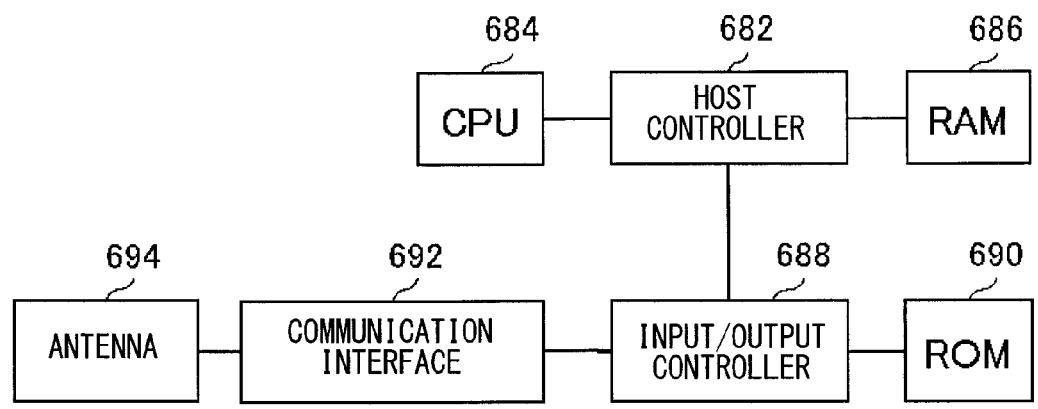
FIG. 18 schematically illustrates one example of the hardware configuration of the communication apparatus 600.

FIG. 18 schematically illustrates one example of the hardware configuration of the communication apparatus 600. The communication apparatus 600 comprises a host controller 682, a CPU 684, a RAM 686, an input/output controller 688, a ROM 690, a communication interface 692, and an antenna 694. The host controller 682 connects the RAM 686, and the CPU 684 that accesses the RAM 686. The CPU 684 performs operation based on a program stored in the ROM 690 and the RAM 686, and controls each unit. The input/output controller 688 connects the host controller 682, the ROM 690, and the communication interface 692.

The program installed and run in the communication apparatus 600 acts on the CPU 684 and the like to cause the communication apparatus 600 to function as the memory unit 602, the beacon transmitting unit 604, the request signal receiving unit 606, the request processing unit 614, the response signal transmitting unit 616, the threshold changing unit 624, the terminal-related information acquiring unit 626, the peripheral situation information acquiring unit 640, and the communication control unit 650 that were explained in FIGS. 14 to 17.

Also, the hardware configuration of the communication control apparatus 920 may be identical with the hardware configuration of the communication apparatus 600 illustrated in FIG. 18. The program installed and run in the communication control apparatus 920 acts on the CPU 684 and the like to cause the communication control apparatus 920 to function as the threshold changing unit 924, the terminal-related information acquiring unit 926, and the peripheral situation information acquiring unit 940 that were explained in FIGS. 14 to 17.

In the above-mentioned embodiment, the communication apparatus 100 may further comprise the configuration that the communication apparatus 600 comprises. Also, the communication apparatus 600 may further comprises the configuration that the communication apparatus 100 comprises.

In order to stably switch from a wireless communication network to a WiFi access point without degrading the quality of communication, control may be performed by changing a beacon intensity, in combination with and in addition to control performed by changing the threshold for an authentication request and the threshold for an association request, thereby further enhancing the reliability. Also, when switching, or switching back, from a WiFi access point connection to a wireless communication network, by combining a function, at an access point, of forcibly disconnecting WiFi connection (kick-out function) under control of the access point side in a case that the WiFi signal reception level of a communication terminal falls below a predetermined value, switching is performed to the wireless communication network stably before degradation of the quality of WiFi communication, and provision of a stable communication service can be maintained without making a user of the communication terminal aware of temporary degradation of the quality of communication in a sequence of processes of WiFi access point connection to disconnection. The above-mentioned four thresholds of authentication, association, beacon, and the kick-out function are adjusted to values appropriate to the behavior of the quality of communication of a user, according to the place of installation of an access point.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:
1. A communication system comprising:
a communication apparatus; and
a communication control apparatus, wherein
the communication apparatus has:
  a request signal receiving unit that receives at least two of a probe request, an authentication request, and an association request from a communication terminal;
  a quality judging unit that judges whether a signal quality of the probe request is higher than a first threshold, judges whether the signal quality of the authentication request is higher than a second threshold that is different from the first threshold, and judges whether the signal quality of the association request is higher than a third threshold that is different from the first threshold and the second threshold;
  a response signal transmitting unit that transmits the response signal in response to the probe request when the signal quality of the probe request is higher than the first threshold, transmits the response signal in response to the authentication request when the signal quality of the authentication request is higher than the second threshold, and transmits the response signal in response to the association request when the signal quality of the association request is higher than the third threshold, and a threshold changing unit that changes at least any of the first threshold, the second threshold, and the third threshold according to a predetermined condition.

2. The communication system according to claim 1, wherein the predetermined condition is based on an area where the communication apparatus is arranged.

3. A communication apparatus comprising:

a request signal receiving unit that receives at least two of a probe request, an authentication request, and an association request from the communication terminal, a quality judging unit that judges whether a signal quality of the probe request is higher than a first threshold, judges whether the signal quality of the authentication request is higher than a second threshold that is different from the first threshold, and judges whether the signal quality of the association request is higher than a third threshold that is different from the first threshold and the second threshold, a response signal transmitting unit that transmits the response signal in response to the probe request when the signal quality of the probe request is higher than the first threshold, transmits the response signal in response to the authentication request when the signal quality of the authentication request is higher than the second threshold, and transmits the response signal in response to the association request when the signal quality of the association request is higher than the third threshold, and a threshold changing unit that changes at least any of the first threshold, the second threshold, and the third threshold according to a predetermined condition.

4. The communication apparatus according to claim 3, further comprising:

a terminal-related information acquiring unit that acquires terminal-related information that is information related to the communication terminal, wherein the predetermined condition is based on the terminal-related information.

5. The communication apparatus according to claim 3, further comprising:

a threshold list receiving unit that receives, from a communication control apparatus, a threshold list in which a threshold is registered for each of a plurality of predetermined conditions, wherein the threshold changing unit changes the at least any of the first threshold, the second threshold, and the third threshold according to the predetermined condition by referring to the threshold list received by the threshold list receiving unit.

6. The communication apparatus according to claim 3, wherein the threshold changing unit changes the at least any of the first threshold, the second threshold, and the third threshold according to a number of the at least two of the probe request, the authentication request, and the association request received from the communication terminal within a predetermined time period.

7. The communication apparatus according to claim 3, further comprising:

a peripheral situation information acquiring unit that acquires peripheral situation information indicating a peripheral situation of the communication apparatus, wherein the predetermined condition is based on the peripheral situation information.

8. The communication apparatus according to claim 3, further comprising:

a communication monitoring unit that monitors communication by the communication apparatus and collects data on the communication by the communication apparatus, wherein the predetermined condition is based on the data collected by the communication monitoring unit.

9. The communication apparatus according to claim 3, wherein the predetermined condition is based on an area where the communication apparatus is arranged.

* * * * *